(12) United States Patent
Otvagin et al.

(10) Patent No.: US 10,785,255 B1
(45) Date of Patent: Sep. 22, 2020

(54) CLUSTER CONFIGURATION WITHIN A SCALABLE MALWARE DETECTION SYSTEM

(71) Applicant: FireEye, Inc., Milpitas, CA (US)

(72) Inventors: Alexander Otvagin, Campbell, CA (US); Sakthi Subramanian, San Jose, CA (US); Krists Krilovs, Sunnyvale, CA (US); Diptesh Chatterjee, Sunnyvale, CA (US); Prakhyath Rajanna, Milpitas, CA (US)

(73) Assignee: FireEye, Inc., Milpitas, CA (US)

( * ) Notice: Subject to any disclaimer, the term of this patent is extended or adjusted under 35 U.S.C. 154(b) by 501 days.

(21) Appl. No.: 15/283,128

(22) Filed: Sep. 30, 2016

Related U.S. Application Data

(60) Provisional application No. 62/313,642, filed on Mar. 25, 2016.

(51) Int. Cl.
*H04L 29/06* (2006.01)
(52) U.S. Cl.
CPC ........ *H04L 63/145* (2013.01); *H04L 63/1416* (2013.01); *H04L 63/1425* (2013.01)
(58) Field of Classification Search
CPC ............... H04L 63/145; H04L 63/1416; H04L 63/1425
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |

(Continued)

FOREIGN PATENT DOCUMENTS

| | | | |
|---|---|---|---|
| GB | 2439806 A | 1/2008 | |
| GB | 2448065 A | 10/2008 | |

(Continued)

OTHER PUBLICATIONS

U.S. Appl. No. 15/283,108, filed Sep. 30, 2016 Advisory Action dated Nov. 16, 2018.

(Continued)

*Primary Examiner* — Joseph P Hirl
*Assistant Examiner* — Ka Shan Choy
(74) *Attorney, Agent, or Firm* — Rutan & Tucker, LLP

(57) ABSTRACT

A scalable, malware detection system features at least one sensor and a cluster including at least one computing node. The computing node includes an analysis coordination system and an object analysis system. The analysis coordination system, when activated as a broker computing node, (i) receives metadata from a sensor, (ii) analyzes the metadata, and (iii) places at least a portion of the metadata into a data store for subsequent use in retrieval of the suspicious object by the object analysis system from the sensor. The object analysis system is configured to (i) retrieve the portion of the metadata, which includes at least a sensor identifier, from the data store, (ii) retrieve the suspicious object from the sensor using at least part of the portion of the metadata retrieved from the data store, and (iii) analyze the suspicious object for malware.

32 Claims, 9 Drawing Sheets

(56) References Cited

U.S. PATENT DOCUMENTS

| | | |
|---|---|---|
| 5,657,473 A | 8/1997 | Killean et al. |
| 5,802,277 A | 9/1998 | Cowlard |
| 5,828,847 A | 10/1998 | Gehr et al. |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,032,189 A | 2/2000 | Jinzenji et al. |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,195,680 B1 | 2/2001 | Goldszmidt et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,188,367 B1 | 3/2007 | Edwards et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,492,780 B2 | 2/2009 | Goolsby |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,438 B1 | 1/2010 | Dash et al. |
| 7,644,441 B2 | 1/2010 | Schmid et al. |
| 7,653,592 B1 | 1/2010 | Flaxman et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,865,614 B2 | 1/2011 | Lu et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,760 B2 | 5/2011 | Ross et al. |
| 7,937,761 B1 | 5/2011 | Bennett |
| 7,949,849 B2 | 5/2011 | Lowe et al. |
| 7,971,208 B2 | 6/2011 | Stokes |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,065,660 B1 | 11/2011 | Tanner et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,054 B1 | 7/2012 | Lu |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,302,192 B1 | 10/2012 | Cnudde et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |

(56) References Cited

U.S. PATENT DOCUMENTS

| | | |
|---|---|---|
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,468,602 B2 | 6/2013 | McDougal et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B1 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,788 B2 | 7/2014 | Krueger et al. |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,862,675 B1 | 10/2014 | Coomer et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,914,406 B1 | 12/2014 | Haugsnes et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,021,043 B2 | 4/2015 | Andersen |
| 9,027,135 B1 | 5/2015 | Aziz |
| 9,071,535 B2 | 6/2015 | Chattopadhyay et al. |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,689 B1 | 8/2015 | Apte et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,210,156 B1 | 12/2015 | Little et al. |
| 9,223,972 B1 | 12/2015 | Vincent et al. |
| 9,223,980 B1 | 12/2015 | Bao |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,342,695 B2 | 5/2016 | Barkan |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,489,516 B1 | 11/2016 | Lu et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |

(56) References Cited

U.S. PATENT DOCUMENTS

| | | |
|---|---|---|
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 * | 12/2017 | Khalid ............... G06F 21/566 |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0024826 A1 | 2/2004 | Halahmi et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0049825 A1 | 3/2005 | King et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0198247 A1 | 9/2005 | Perry et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0037079 A1 | 2/2006 | Midgley |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0149704 A1 | 7/2006 | Wyatt et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |

(56) References Cited

U.S. PATENT DOCUMENTS

| | | |
|---|---|---|
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0265637 A1 | 11/2006 | Marriott et al. |
| 2006/0271784 A1 | 11/2006 | Bolosky et al. |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038703 A1 | 2/2007 | Tendjoukian et al. |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0083930 A1 | 4/2007 | Dumont et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0282848 A1 | 12/2007 | Kiilerich et al. |
| 2008/0005782 A1 | 1/2008 | Aziz |
| 2008/0018122 A1 | 1/2008 | Zierler et al. |
| 2008/0022205 A1 | 1/2008 | Shinkai et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0117816 A1 | 5/2008 | Stone et al. |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0243878 A1 | 10/2008 | de Spiegeleer et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0274384 A1 | 11/2009 | Jakobovits |
| 2009/0287653 A1 | 11/2009 | Bennett |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115242 A1 | 5/2010 | Yamada |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192152 A1 | 7/2010 | Miyamoto et al. |
| 2010/0192223 A1 | 7/2010 | Ismael et al. |
| 2010/0202236 A1 | 8/2010 | Kahler et al. |
| 2010/0205279 A1 | 8/2010 | Takakura |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0010697 A1 | 1/2011 | Golovkin |
| 2011/0025504 A1 | 2/2011 | Lyon et al. |
| 2011/0041179 A1 | 2/2011 | St Hlberg |
| 2011/0047594 A1 | 2/2011 | Mahaffey et al. |

(56) References Cited

U.S. PATENT DOCUMENTS

| | | |
|---|---|---|
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0125778 A1 | 5/2011 | Kubo |
| 2011/0128965 A1 | 6/2011 | Brehm et al. |
| 2011/0131621 A1 | 6/2011 | Brehm et al. |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153743 A1 | 6/2011 | Lindner et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0191341 A1 | 8/2011 | Meyer et al. |
| 2011/0219449 A1 | 9/2011 | St. Neitzel et al. |
| 2011/0219450 A1 | 9/2011 | McDougal et al. |
| 2011/0219451 A1 | 9/2011 | McDougal et al. |
| 2011/0225624 A1 | 9/2011 | Sawhney et al. |
| 2011/0225655 A1 | 9/2011 | Niemela et al. |
| 2011/0231901 A1 | 9/2011 | Nakamura et al. |
| 2011/0247072 A1 | 10/2011 | Staniford et al. |
| 2011/0265182 A1 | 10/2011 | Peinado et al. |
| 2011/0280240 A1 | 11/2011 | Yamagaki et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0321124 A1 | 12/2011 | Kisin et al. |
| 2012/0023209 A1 | 1/2012 | Fletcher et al. |
| 2012/0023593 A1 | 1/2012 | Puder et al. |
| 2012/0054869 A1 | 3/2012 | Yen et al. |
| 2012/0063319 A1 | 3/2012 | Christin et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0204144 A1 | 8/2012 | Fioritoni et al. |
| 2012/0210423 A1 | 8/2012 | Friedrichs et al. |
| 2012/0216046 A1* | 8/2012 | McDougal ............... G06F 21/56 713/183 |
| 2012/0216244 A1 | 8/2012 | Kumar et al. |
| 2012/0221571 A1 | 8/2012 | Orman |
| 2012/0222121 A1 | 8/2012 | Staniford et al. |
| 2012/0246337 A1 | 9/2012 | Ross |
| 2012/0252439 A1 | 10/2012 | Peterson et al. |
| 2012/0254321 A1 | 10/2012 | Lindsay et al. |
| 2012/0254917 A1 | 10/2012 | Burkitt et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0290584 A1 | 11/2012 | De Bona et al. |
| 2012/0297489 A1 | 11/2012 | Dequevy |
| 2012/0323131 A1 | 12/2012 | Ting et al. |
| 2012/0330801 A1 | 12/2012 | McDougal et al. |
| 2012/0331553 A1 | 12/2012 | Aziz et al. |
| 2013/0007883 A1 | 1/2013 | Zaitsev |
| 2013/0014259 A1 | 1/2013 | Gribble et al. |
| 2013/0036472 A1 | 2/2013 | Aziz |
| 2013/0047034 A1 | 2/2013 | Salomon et al. |
| 2013/0047257 A1 | 2/2013 | Aziz |
| 2013/0067023 A1* | 3/2013 | Joy ....................... H04L 63/1458 709/217 |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0148158 A1 | 6/2013 | Kanakubo |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0223608 A1 | 8/2013 | Flockhart et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263122 A1 | 10/2013 | Levijarvi et al. |
| 2013/0263260 A1 | 10/2013 | Mahaffey et al. |
| 2013/0291109 A1 | 10/2013 | Staniford et al. |
| 2013/0298192 A1 | 11/2013 | Kumar et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0336285 A1 | 12/2013 | Edara et al. |
| 2013/0340080 A1* | 12/2013 | Gostev .................. H04L 63/145 726/24 |
| 2013/0345887 A1 | 12/2013 | Govindan et al. |
| 2014/0007236 A1 | 1/2014 | Krueger et al. |
| 2014/0019962 A1 | 1/2014 | Litty et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0122569 A1 | 5/2014 | Abel et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0229221 A1 | 8/2014 | Shih et al. |
| 2014/0237600 A1 | 8/2014 | Silberman et al. |
| 2014/0280245 A1 | 9/2014 | Wilson |
| 2014/0281514 A1 | 9/2014 | Erofeev et al. |
| 2014/0283037 A1 | 9/2014 | Sikorski et al. |
| 2014/0283063 A1 | 9/2014 | Thompson et al. |
| 2014/0310483 A1 | 10/2014 | Bennett |
| 2014/0328204 A1 | 11/2014 | Klotsche et al. |
| 2014/0330976 A1 | 11/2014 | van Bemmel |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0089252 A1 | 3/2015 | Chen |
| 2015/0095961 A1 | 4/2015 | Kliger et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |

(56) References Cited

U.S. PATENT DOCUMENTS

| | | |
|---|---|---|
| 2015/0100617 A1 | 4/2015 | Diederich et al. |
| 2015/0180764 A1 | 6/2015 | Pacella et al. |
| 2015/0180886 A1 | 6/2015 | Staniford et al. |
| 2015/0181614 A1 | 6/2015 | Mitra et al. |
| 2015/0186645 A1 | 7/2015 | Aziz et al. |
| 2015/0189005 A1 | 7/2015 | Dubois et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0229656 A1 | 8/2015 | Shieh |
| 2015/0236821 A1 | 8/2015 | Degraaf et al. |
| 2015/0278243 A1 | 10/2015 | Vincent et al. |
| 2015/0319182 A1 | 11/2015 | Natarajan et al. |
| 2015/0334511 A1 | 11/2015 | Rivera et al. |
| 2015/0350134 A1 | 12/2015 | Yang et al. |
| 2015/0370723 A1 | 12/2015 | Nambiar et al. |
| 2015/0372980 A1 | 12/2015 | Eyada |
| 2015/0373036 A1 | 12/2015 | Patne et al. |
| 2015/0373043 A1 | 12/2015 | Wang et al. |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0044035 A1 | 2/2016 | Huang |
| 2016/0070589 A1 | 3/2016 | Vermeulen et al. |
| 2016/0099963 A1 | 4/2016 | Mahaffey et al. |
| 2016/0110544 A1 | 4/2016 | Singla |
| 2016/0119379 A1 | 4/2016 | Nadkarni |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0197949 A1 | 7/2016 | Nyhuis et al. |
| 2016/0212239 A1 | 7/2016 | Das et al. |
| 2016/0217176 A1 | 7/2016 | Haviv et al. |
| 2016/0261612 A1 | 9/2016 | Mesdaq et al. |
| 2016/0269427 A1 | 9/2016 | Haugsnes |
| 2016/0269437 A1* | 9/2016 | McDougal .......... H04L 63/1433 |
| 2016/0275303 A1 | 9/2016 | Narayanaswamy et al. |
| 2016/0285914 A1 | 9/2016 | Singh et al. |
| 2016/0294829 A1 | 10/2016 | Angus |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2017/0085565 A1 | 3/2017 | Sheller et al. |
| 2017/0093897 A1 | 3/2017 | Cochin et al. |
| 2017/0164218 A1 | 6/2017 | Ni et al. |
| 2017/0180421 A1 | 6/2017 | Shieh et al. |
| 2017/0250997 A1 | 8/2017 | Rostamabadi et al. |
| 2017/0251013 A1 | 8/2017 | Kirti et al. |
| 2017/0257767 A1 | 9/2017 | Zhao et al. |
| 2018/0013770 A1 | 1/2018 | Ismael |
| 2018/0027006 A1 | 1/2018 | Zimmermann et al. |
| 2018/0048660 A1 | 2/2018 | Paithane et al. |
| 2018/0121316 A1 | 5/2018 | Ismael et al. |
| 2018/0144128 A1 | 5/2018 | Hakuta et al. |
| 2018/0227627 A1 | 8/2018 | Jabara et al. |
| 2018/0288077 A1 | 10/2018 | Siddiqui et al. |
| 2018/0293111 A1 | 10/2018 | Chen et al. |
| 2018/0295508 A1 | 10/2018 | Kyllonen |
| 2018/0367560 A1 | 12/2018 | Mahaffey et al. |
| 2019/0109849 A1 | 4/2019 | Frempong et al. |

FOREIGN PATENT DOCUMENTS

| | | |
|---|---|---|
| GB | 2490431 A | 10/2012 |
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

U.S. Appl. No. 15/283,108, filed Sep. 30, 2016 Final Office Action dated Jul. 26, 2018.

U.S. Appl. No. 15/283,108, filed Sep. 30, 2016 Non-Final Office Action dated Feb. 23, 2018.

U.S. Appl. No. 15/283,108, filed Sep. 30, 2016 Non-Final Office Action dated Mar. 7, 2019.

U.S. Appl. No. 15/283,126, filed Sep. 30, 2016 Non-Final Office Actiong dated Sep. 7, 2018.

U.S. Appl. No. 15/283,126, filed Sep. 30, 2016 Notice of Allowance dated Mar. 4, 2019.

U.S. Appl. No. 15/283,209, filed Sep. 30, 2016 Non-Final Office Action dated Feb. 8, 2019.

Venezia, Paul , "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36TH Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al, UCSB, Sep. 2007 https://www.cs.ucsb.edu/.about.chris/research/doc/esec07.sub.—mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.iso?reload=true&arnumber=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye") (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlaq Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

(56) References Cited

OTHER PUBLICATIONS

Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 15/283,108, filed Sep. 30, 2016 Final Office Action dated Oct. 31, 2019.
U.S. Appl. No. 15/283,209, filed Sep. 30, 2016 Final Office Action dated Aug. 15, 2019.
U.S. Appl. No. 15/283,209, filed Sep. 30, 2016 Notice of Allowance dated Nov. 15, 2019.
U.S. Appl. No. 15/390,930, filed Dec. 27, 2016 Final Office Action dated May 15, 2019.
U.S. Appl. No. 15/390,930, filed Dec. 27, 2016 Non-Final Office Action dated Nov. 2, 2018.

\* cited by examiner

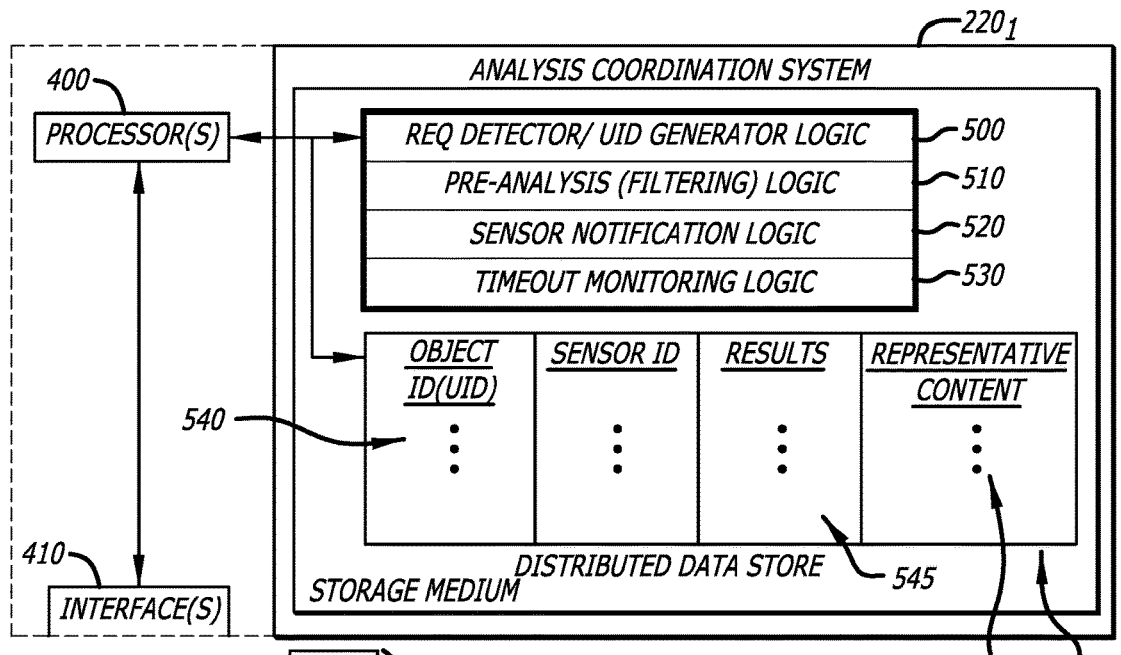
FIG. 5A
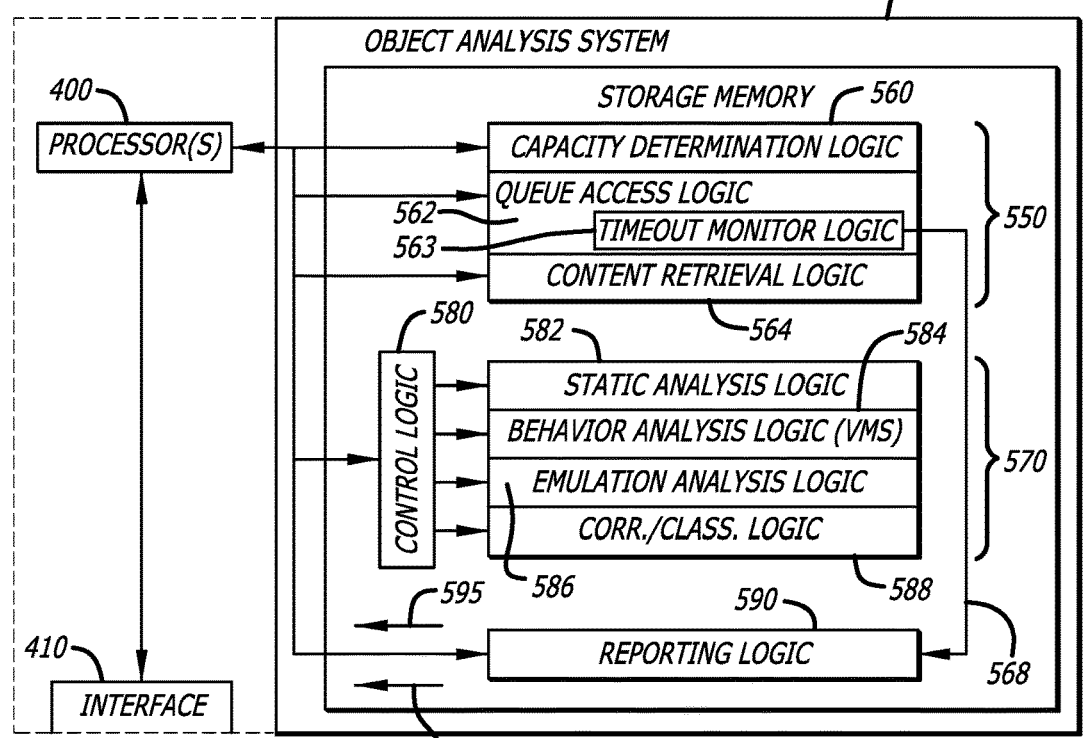
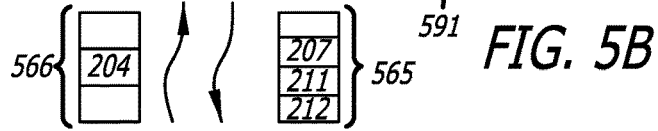
FIG. 5B

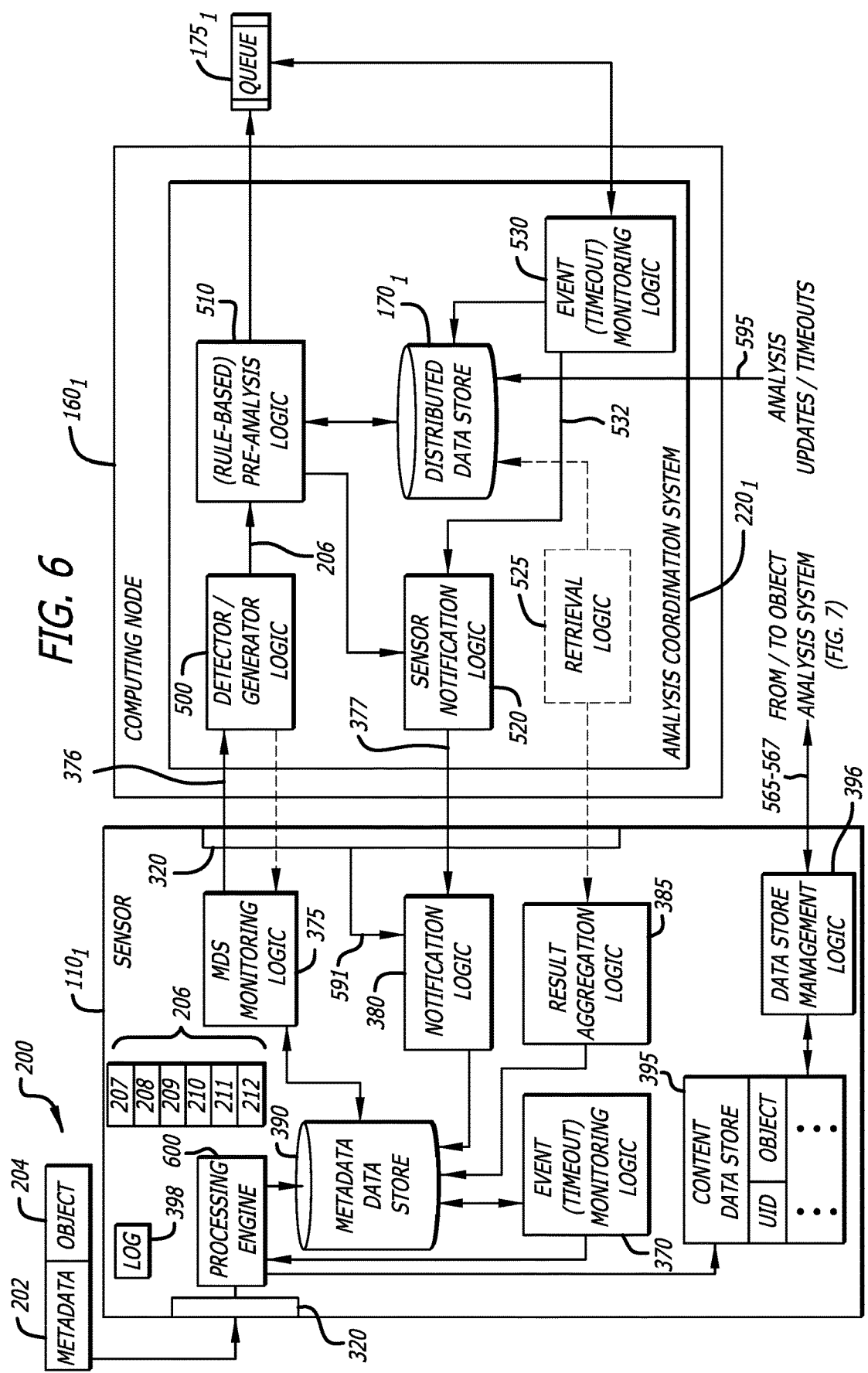

CLUSTER CONFIGURATION WITHIN A SCALABLE MALWARE DETECTION SYSTEM

CROSS REFERENCE TO RELATED APPLICATIONS

This application claims the benefit of priority on U.S. Provisional Patent Application No. 62/313,642, filed Mar. 25, 2016, the entire contents of which are incorporated by references.

FIELD

Embodiments of the disclosure relate to the field of cybersecurity. More specifically, one embodiment of the disclosure relates to a scalable, malware detection system.

GENERAL BACKGROUND

Over the last decade, cybersecurity attacks have become a pervasive problem for internet users as many networked devices and other resources have been subjected to attack and compromised. The attack may involve the infiltration of malicious software onto a network device or concentration on an exploit residing within a network device to perpetrate the cybersecurity attack (generally referred to as "malware").

Recently, malware detection has undertaken three different approaches. One approach involves the installation of anti-virus software within network devices forming an enterprise network. Given that advanced malware is able to circumvent anti-virus analysis, this approach has been determined to be deficient.

Another approach involves the placement of dedicated malware detection appliances at various ingress points throughout a network or subnetwork. The malware detection appliances are configured to extract information propagating over the network at the ingress point, analyze the information to determine a level of suspiciousness, and conduct malware analysis internally within the appliance itself. While successful in detecting advanced malware that is attempting to infect network devices connected to the network (or subnetwork), as network traffic increases, this appliance-based approach may exhibit resource constraints. Stated differently, the dedicated, malware detection appliance has a prescribed (and finite) amount of resources (for example, bandwidth and processing power) that, once fully in use, requires either the malware detection appliance to resort to more selective traffic inspection or additional (and/or upscaled) malware detection appliances to be installed. The later solution requires a large outlay of capital and network downtime, as IT resources are needed to install the new malware detection appliances. Also, these dedicated, malware detection appliances provide limited scalability and flexibility in deployment.

Yet another approach involves the use of exclusive, cloud-based malware detection appliances. However, this exclusive, cloud-based solution suffers from a number of disadvantages, including the inability of providing on-site deployment of resources at an enterprise's premises (e.g., as devices that are part of the enterprise's network infrastructure). On-site deployment may be crucial for compliance with requirements as to personally identifiable information (PII) and other sensitive information including those mandated at local, state, country or regional governmental levels.

BRIEF DESCRIPTION OF THE DRAWINGS

Embodiments of the invention are illustrated by way of example and not by way of limitation in the figures of the accompanying drawings, in which like references indicate similar elements and in which:

FIG. 5A is a block diagram of an exemplary embodiment of logic implemented within an analysis coordination system that is operating as part of the computing node of FIG. 4.

FIG. 5B is a block diagram of an exemplary embodiment of logic implemented within an object analysis system that is operating as part of the computing node of FIG. 4.

FIG. 6 is a flow diagram of operations conducted by an exemplary embodiment of logic implemented within the sensor of FIG. 3 and the computing node of FIG. 4.

DETAILED DESCRIPTION

Figure 1:
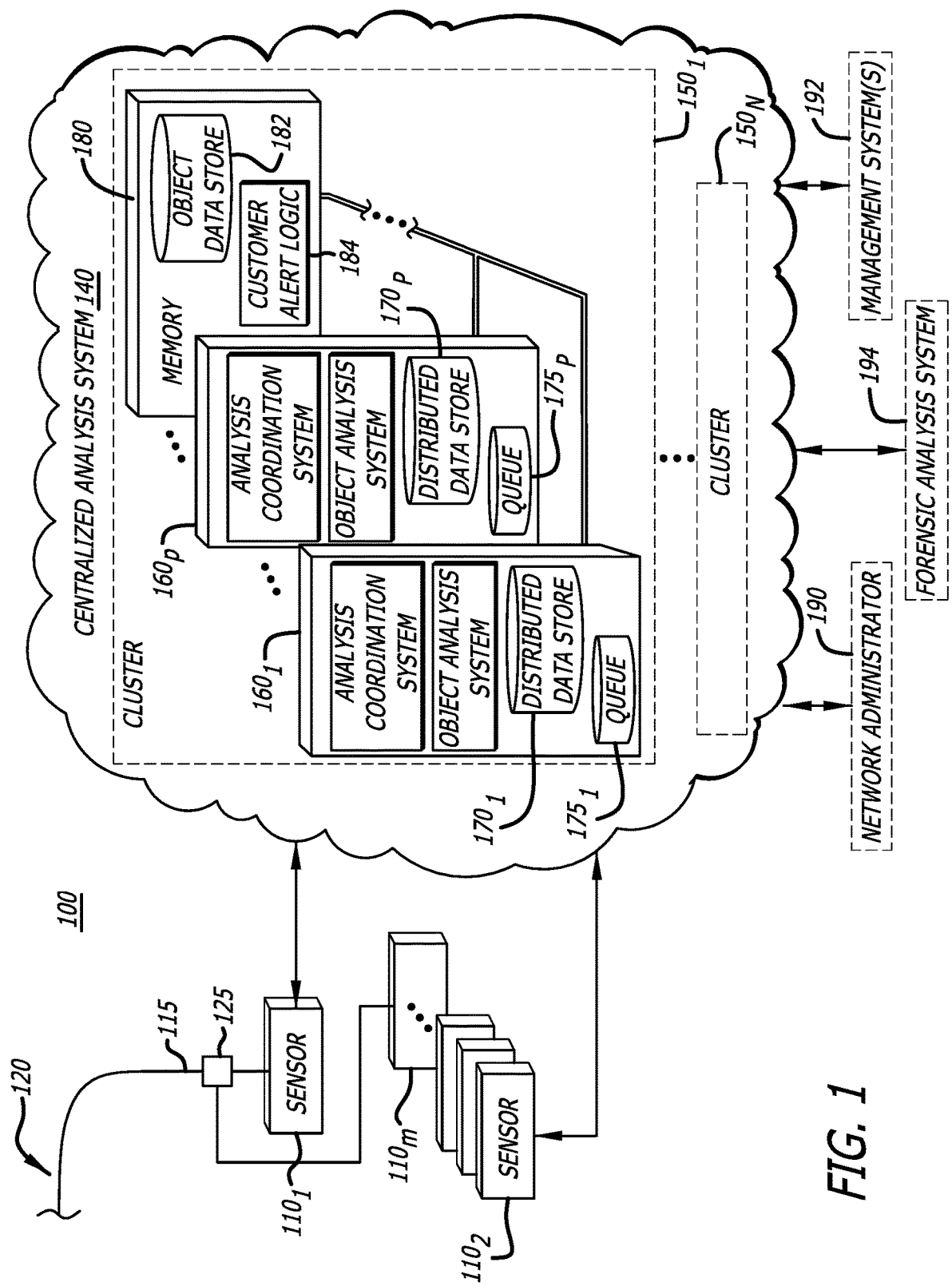
FIG. 1 is a block diagram of an exemplary embodiment of a malware detection system.

Embodiments of the present disclosure generally relate to a cluster architecture for a scalable, malware detection system. The scalable, malware detection system may be configured in accordance with either an asynchronous load balancing architecture (see FIGS. 2-7) or a synchronous load balancing architecture (see FIGS. 8-10). Each of these architectures includes one or more sensors and one or more clusters of computing nodes.

In general, the asynchronous load balancing architecture relies on a distributed queue architecture for each cluster, where each computing node within that cluster individually determines whether it has sufficient resources to conduct an analysis for malware on objects provided from one or more on-site sensors (described below). Stated differently, each of the computing nodes for a cluster has access to the distributed queue and retrieves metadata associated with suspicious objects awaiting malware analysis from the queue upon determining that it has sufficient resources to conduct malware analysis on a suspicious object. In contrast, the synchronous load balancing architecture deploys a computing node with a load balancing logic that is configured to receive load information from logic within each of the computing nodes within the cluster. Based on the load information, the load balancing logic selects the one of these computing nodes that is responsible for analyzing a suspicious object for malware.

Each cluster is a scalable architecture that includes at least one computing node and allows additional computing nodes to be added as the network traffic increases. Highly scalable in number based on network load, the cluster of computing nodes is configured so that the computing nodes collectively analyze suspicious objects received from the sensors. In particular, a particular computing node of the cluster obtains metadata associated with a suspicious object from a distributed queue when the computing node is available to conduct a malware analysis of a suspicious object. The metadata is used by the computing node to obtain the suspicious object from the second data store.

Based on the results of the malware analysis, the computing node may determine that the suspicious object is associated with malware. The results of the malware analysis may include, but is not limited or restricted to (i) information that classifies the object as potentially malicious or benign, (ii) a hash value of the suspicious object, (iii) information that denotes a severity of the malware associated with the suspicious object determined to correspond to a malicious object, and/or (iv) resultant information from the analysis of the suspicious object. The resultant information may be used, at least in part, to generate an alert that is reported to a targeted entity (e.g., network administrator, a management system, a forensics analysis system, or the like). The resultant information may also be utilized in the generation of a threat (malware) signature used locally by the computing node or globally by other computing nodes and/or clusters. Additionally, the resultant information may be uploaded to the distributed data store for use as analytic data.

As described herein, with respect to the cluster configured in accordance with an asynchronous load balancing architecture, each computing node includes an analysis coordination system (also referred to as "analysis coordinator") and an object analysis system (also referred to as an "object analyzer"). Depending on the role of the computing node, the analysis coordination system may be activated or deactivated. For instance, when the analysis coordination system is activated, the computing node is configured to operate as a "broker" computing node (e.g., a network device that is selected to directly communicate with any or all of the sensors that are assigned to use the cluster for more in-depth malware analysis of a suspicious object). As a "broker" computing node, the analysis coordination system may be responsible for (i) analyzing the metadata to determine whether the suspicious object is identical or substantially similar to an object that has previously undergone malware analysis within a cluster of the malware detection system, and if so, reporting the results of the previous malware analysis to the sensor; (ii) distributing the metadata associated with the suspicious object to the distributed data store, where at least a portion of the metadata may be used by an object analysis system (of the same computing node or a different computing node) to obtain the suspicious object for processing; and/or (iii) monitoring for timeout events based on a lack of timely analysis of the suspicious object corresponding to the metadata within the distributed data store. As an optional feature, the analysis coordination system may be responsible for assigning an identifier in response to receipt of metadata corresponding to the suspicious object as provided by a sensor.

According to one embodiment of the disclosure, as described above, the metadata provides information that enables the analysis coordination system to determine whether an identical (or substantially similar) object was previously analyzed for malware and to monitor for a timeout event caused by delayed analysis of the suspicious object. As such, the metadata may include a representation of the suspicious object (e.g., checksum, hash, etc.), and/or an identifier associated with the object and its corresponding metadata (e.g., assigned name, sequence of characters, etc.), which is sometimes referred to as the "object identifier".

Independent of the analysis coordination system being activated or deactivated, in response to confirming sufficient resources, one of the object analysis systems associated with cluster of computing nodes accesses the metadata in the distributed queue. The object identifier within the stored metadata is used to obtain the suspicious object from the second data store, namely a data store external to the cluster. Upon receipt of the suspicious object, the object analysis system is configured to conduct one or more analyses on the object to determine whether the likelihood of the suspicious object being associated with malware exceeds a second prescribed threshold that may be greater than the first prescribed threshold. Examples of these analyses may include a static analysis (analysis of characteristics of the suspicious object), a behavior analysis (analysis of behaviors of a virtual machine processing the suspicious object), and/or an emulation of the operability of the suspicious object. The results of any analysis or analyses may be stored within the distributed data store, where the results are made available to other computing nodes forming the cluster. The results may also be made available to the sensor that provided the suspicious object for analysis.

According to another embodiment of the disclosure, as described above, the cluster may be configured in accordance with a synchronous load balancing architecture. Herein, the "broker" computing node includes a load balancer that monitors workload of each object analysis system in the cluster. Hence, the analysis coordination system of the broker computing node is configured to determine which object analysis system (of a plurality of object analysis systems) is to handle malware analysis for a newly submitted object. Such routing is accomplished by a proxy server deployed as part of the analysis coordination system. Herein, in lieu of a distributed data store, each object analysis system includes a load monitor that provides load information to each load balancer of the one or more "broker" computing nodes within the cluster.

I. Terminology

In the following description, certain terminology is used to describe features of the invention. In certain situations, terms "logic," "engine," "subsystem," and "component" may be representative of hardware, firmware and/or software that is configured to perform one or more functions. As hardware, logic (or engine/subsystem/component) may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine/subsystem/component) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "computerized" generally represents that any corresponding operations are conducted by hardware in combination with software and/or firmware.

The term "message" generally refers to information in a prescribed format and transmitted in accordance with a suitable delivery protocol such as Hypertext Transfer Protocol (HTTP), HTTP Secure (HTTPS), Simple Mail Transfer Protocol (SMTP), iMESSAGE, Post Office Protocol (POP), Instant Message Access Protocol (IMAP), or the like. Hence, each message may be in the form of one or more packets, frames, or any other series of bits having the prescribed format. Messages may correspond to HTTP data transmissions, email messages, text messages, or the like.

According to one embodiment, the term "malware" may be construed broadly as any code or activity that initiates a malicious attack or any operations associated with anomalous or unwanted behavior. For instance, malware may correspond to a type of malicious computer code that executes an exploit to take advantage of a vulnerability, for example, to harm or co-opt operation of a network device or misappropriate, modify or delete data. In the alternative, malware may correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of a network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. In yet another alternative, malware may correspond to information that pertains to the unwanted behavior such as a process that causes data such as a contact list from a network (endpoint) device to be uploaded by a network to an external storage device without receiving permission from the user.

In certain instances, the terms "compare," "comparing," "comparison" or other tenses thereof generally mean determining if a match (e.g., a certain level of correlation) is achieved between two items where one of the items may include a particular pattern.

The term "network device" should be construed as any electronic device with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, standalone appliance, a router or other intermediary communication device, etc. Other examples of a network device includes a sensor (described above) as well as a computing node, namely hardware and/or software that operates as a network device to receive information from a sensor, and when applicable, perform malware analysis on that information.

The term "transmission medium" may be construed as a physical or logical communication path between two or more network devices (e.g., any devices with data processing and network connectivity such as, for example, a sensor, a computing node, mainframe, a computer such as a desktop or laptop, netbook, tablet, firewall, smart phone, router, switch, bridge, etc.) or between components within a network device. For instance, as a physical communication path, wired and/or wireless interconnects in the form of electrical wiring, optical fiber, cable, bus trace, or a wireless channel using infrared, radio frequency (RF), may be used.

The term "data submission" is a collection of data including an object and/or metadata associated with that object. The term "object" generally relates to content having a logical structure or organization that enables it to be classified for purposes of analysis for malware. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. The object may be retrieved from information in transit (e.g., a plurality of packets) or information at rest (e.g., data bytes from a storage medium). Examples of different types of objects may include a data element, one or more flows, or a data element within a flow itself.

Herein, a "flow" generally refers to related packets that are received, transmitted, or exchanged within a communication session, where multiple (two or more) flows each being received, transmitted or exchanged within a corresponding communication session is referred to as a "multi-flow". A "data element" generally refers to as a plurality of packets carrying related payloads, e.g., a single webpage received over a network. The data element may be an executable or a non-executable, as described above.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Scalable Malware Detection System

Referring to FIG. 1, an exemplary block diagram of a distributed, malware detection system 100 is shown. The malware detection system 100 comprises one or more sensors 110₁-110_M(M≥1) that are communicatively coupled to a centralized analysis system 140. Some or all of the centralized analysis system 140 may be located at an enterprise's premises (e.g., located as any part of the enterprise's network infrastructure whether located at a single facility utilized by the enterprise or at a plurality of facilities). As an alternative embodiment, some or all of the centralized analysis system 140 may be located outside the enterprise's network infrastructure, generally referred to as public or private cloud-based services that may be hosted by a cybersecurity provider or another entity separate from the enterprise (service customer). Obtaining a high degree of deployment flexibility, embodiments can also provide "hybrid" solutions, where the malware detection system 100 can include some of the centralized analysis system 140 located on premises and some as a cloud-based service. This provides optimal scaling with controlled capital expense as well as the ability to control location(s) of deployments to satisfy local requirements, e.g., as to sensitive information.

As shown in FIG. 1, the sensors 110₁-110_M may be positioned at various locations on a transmission medium 115 that is part of the network 120 (e.g., connected at various ingress points on a wired network or positioned at various locations for receipt of wireless transmissions) and monitor data traffic propagating over the transmission medium 115. The "traffic" may include an electrical transmission of files, email messages, or the like. For instance, each sensor 110₁-110_M may be implemented either as a standalone network device, as logic implemented within a network device, or integrated into a firewall, or as software running on a network device.

More specifically, according to one embodiment of the disclosure, the sensor 110₁ may be implemented as a network device that is coupled to the transmission medium 115 directly or is communicatively coupled with the transmission medium 115 via an interface 125 operating as a data capturing device. According to this embodiment, the interface 125 is configured to receive the incoming data and subsequently process the incoming data, as described below. For instance, the interface 125 may operate as a network tap (in some embodiments with mirroring capability) that provides at least one or more data submissions (or copies thereof) extracted from data traffic propagating over the transmission medium 115. Alternatively, although not shown, the sensor 110₁ may be configured to receive files or other objects automatically (or on command), accessed from a storage system. As yet another alternative, the sensor 110₁ may be configured to receive information that is not provided over the network 120. For instance, as an illustrative example, the interface 125 may operate as a data capturing device (e.g., port) for receiving data submissions manually provided via a suitable dedicated communication link or from portable storage media such as a flash drive.

As further shown in FIG. 1, one sensor 110₁ may be deployed individually or multiple sensors 110₁-110_M may be positioned in close proximity, perhaps sharing the same power source (e.g., common bus plane as described below). The sensors 110₁-110_M are configured to receive intercepted or copied data traffic and conduct an analysis on one or more packets within the data traffic to determine whether any packet or a set of related packets (flow or multi-flow) is suspicious. Such analysis may involve a determination as to whether any packets are sourced by or directed to a particular network device in a "blacklist" or a determination as to whether the body of the packet includes a certain data pattern. In the event that one or more of the packets are determined as suspicious, the monitoring sensor uploads a data submission, including metadata and an object for analysis, to the centralized analysis system 140.

Although not shown, it is contemplated that the sensor 110₁ may be implemented entirely as software for uploading into a network device and operating in cooperation with an operating system running on the network device. For this implementation, the software-based sensor is configured to operate in a manner that is substantially similar or identical to a sensor implemented as a network device. Hence, the logic for the software-based sensor corresponds to software modules that, when executed by a processor, perform functions similarly to the functions performed by logic that is part of the sensor implemented as a network device.

The centralized analysis system 140 features one or more clusters of computing nodes 150₁-150_N (N≥1), where these computing nodes are grouped in order to conduct collective operations for a set of sensors (e.g., sensors 110₁-110_M). Each cluster 150₁-150_N may include computing nodes equipped for malware analysis, including behavioral monitoring while executing (running) objects within one or more virtual machines (VMs). The virtual machines may have different guest image bundles that include a plurality of software profiles each with a different type of operating system (OS), application program, or both. Alternatively, each cluster 150₁-150_N may include computing nodes having identical guest image bundles that include software profiles directed to the same operating system (e.g., Windows® OS cluster, MAC® OS X cluster, etc.). Additionally, the cluster 150₁-150_N may be located to communicate with sensors within the same state, Provence, region or country to ensure compliance with governmental regulations.

As shown, for illustrative purposes, a cluster 150₁ may include a plurality of computing nodes 160₁-160_P (P≥1). The plurality of computing nodes 160₁-160_P may be arranged in a "blade server" type deployment, which allows additional computing nodes to be seamlessly added to or removed from the cluster 150₁ (e.g., computing nodes 160₁-160_P being connected to a common bus plane (network) that may provide both power and signaling between the computing nodes, a hot-swapping deployment of the computing nodes forming the cluster 150₁, or any other deployment that allows a scalable computing node architecture). However, it is contemplated that any or all of clusters 150₁-150_N may be virtualized and implemented as software, where the computing nodes 160₁-160_P are software modules that communicate with each other via a selected communication protocol.

Additionally according to this embodiment of the disclosure, each of the clusters 150₁-150_N (e.g., cluster 150₁) is communicatively coupled to a distributed data store 170 and a distributed queue 175. The distributed data store 170 and the distributed queue 175 may be provided through a separate memory node 180, which is communicatively coupled to and accessed by computing nodes 160₁-160_P. For this embodiment, a data store 182 for storage of the malicious objects (hereinafter "object data store") may be provided in memory node 180. Alternatively, as shown, it is contemplated that the distributed data store 170 and the distributed queue 175 may be provided as a collection of synchronized memories within the computing nodes 160₁-160_P (e.g., synchronized data stores 170₁-170_P that collectively form distributed data store 170; synchronized queues 175₁-175_P that collectively form distributed queue 175 where each of the queues 175₁-175_P is synchronized to store the same information) each accessible by the computing nodes 160₁-160_P respectively. The distributed data store 170 (formed by local data stores $170_1$-$170_P$ operating in accordance with a selected memory coherence protocol) are accessible by the computing nodes $160_1$-$160_P$, and thus, data stores $170_1$-$170_P$ may be configured to store the same information. Alternatively, the data stores $170_1$-$170_P$ may be configured to store different information, provided the collective information is available to all of the computing nodes $160_1$-$160_P$ in the same cluster $150_1$.

Referring still to FIG. 1, one or more management systems 192 may be communicatively coupled to the centralized analysis system 140, where such communications allow for an exchange of information. For instance, although not shown, a management system may be coupled to the interconnects between the computing nodes $160_1$-$160_P$ of each of the clusters $150_1$-$150_N$. As a result, the management system may be configured to receive local threat signatures generated by an object analysis system of a specific computing node (e.g., computing node $160_P$), and thereafter, proliferate these signatures to other computing nodes $160_1$-$160_{P-1}$ and/or other clusters $150_2$-$150_N$ throughout the malware detection system 100.

In order to provide sufficient processing capabilities to the sensors $110_1$-$110_M$ deployed throughout the network 120, the centralized analysis system 140 is scalable by allowing a flexible clustering scheme for computing nodes as well as allowing for the number of clusters to be increased or decreased in accordance with system processing capability. Stated differently, one or more computing nodes (e.g., computing node $160_{P+1}$) may be added to the cluster $150_1$ based on an increase in the current workload of the malware detection system 100. Likewise, one or more computing nodes may be removed from the cluster $150_1$, now forming computing nodes $160_1$-$160_{P-1}$, based on a decrease in the current workload.

As an optional feature, one or more of the clusters $150_1$-$150_N$ may be configured with reporting logic 184 to provide alerts to a customer such as a network administrator 190 of the customer for example, that identify degradation of the operability of that cluster. For example, the reporting logic (illustrated in FIG. 1 as "customer alert logic 184") may be configured to monitor metadata within at least one of the queue $175_1$ (when the contents of each queue $175_1$-$175_P$ are identical) for metadata approaching a timeout condition (e.g., where the amount of time that the metadata has been retained in the queue $175_1$, sometimes referred to as "metadata queuing time," exceeds a timeout value (e.g., the amount of time remaining to conduct a malware analysis on the object corresponding to the metadata). Herein, a selected time threshold (e.g. within a number of minutes, hours, etc.) is set for the cluster $150_1$, where the threshold may be a fixed time, a variable time that is based on cluster size or other factors such as subscription level or customer preference. Accordingly, upon detecting that a certain number of queued metadata entries will potentially experience a timeout condition within the selected time threshold, the customer alert logic 184 transmits an alert signal to the customer reporting a potential degradation in cluster performance. The alert signal identifies to the customer that procurement of additional computing nodes for the cluster $150_1$ may be warranted to avoid anticipated degradation in performance by the cluster $150_1$.

As further shown, clusters $150_1$-$150_N$ may be configured to provide at least a portion of the malware analysis results for an object to a management system 192 that monitors the health and operability of the network 120 and may include an enrollment service that controls formation of the clusters $150_1$-$150_N$ and monitors for an active subscription that indicates whether or not a sensor is authorized to submit objects to a particular cluster or clusters for evaluation and monitors for the type (level) of subscription (e.g., a service level with basic malware analysis functionality, another service level with more robust malware analysis such as increased analysis time per object, increased or user-selectable guest image support, greater quality of service than offered with the basic subscription, access to computing nodes dedicated to processing certain object types, etc.). Additionally, the object and/or analysis results from any of the clusters $150_1$-$150_N$ may be provided to a forensic analysis system 194 for further detailed analysis as to confirm that the object is associated with malware and the nature of the malware. Although not shown, the clusters $150_1$-$150_N$ may be communicatively coupled to remotely located services to receive threat signatures that identify uncovered malware (or information to formulate threat signatures) from the clusters $150_1$-$150_N$ and proliferate these signatures throughout the malware detection system 100.

A. Asynchronous Load Balancing Architecture

Figure 2:
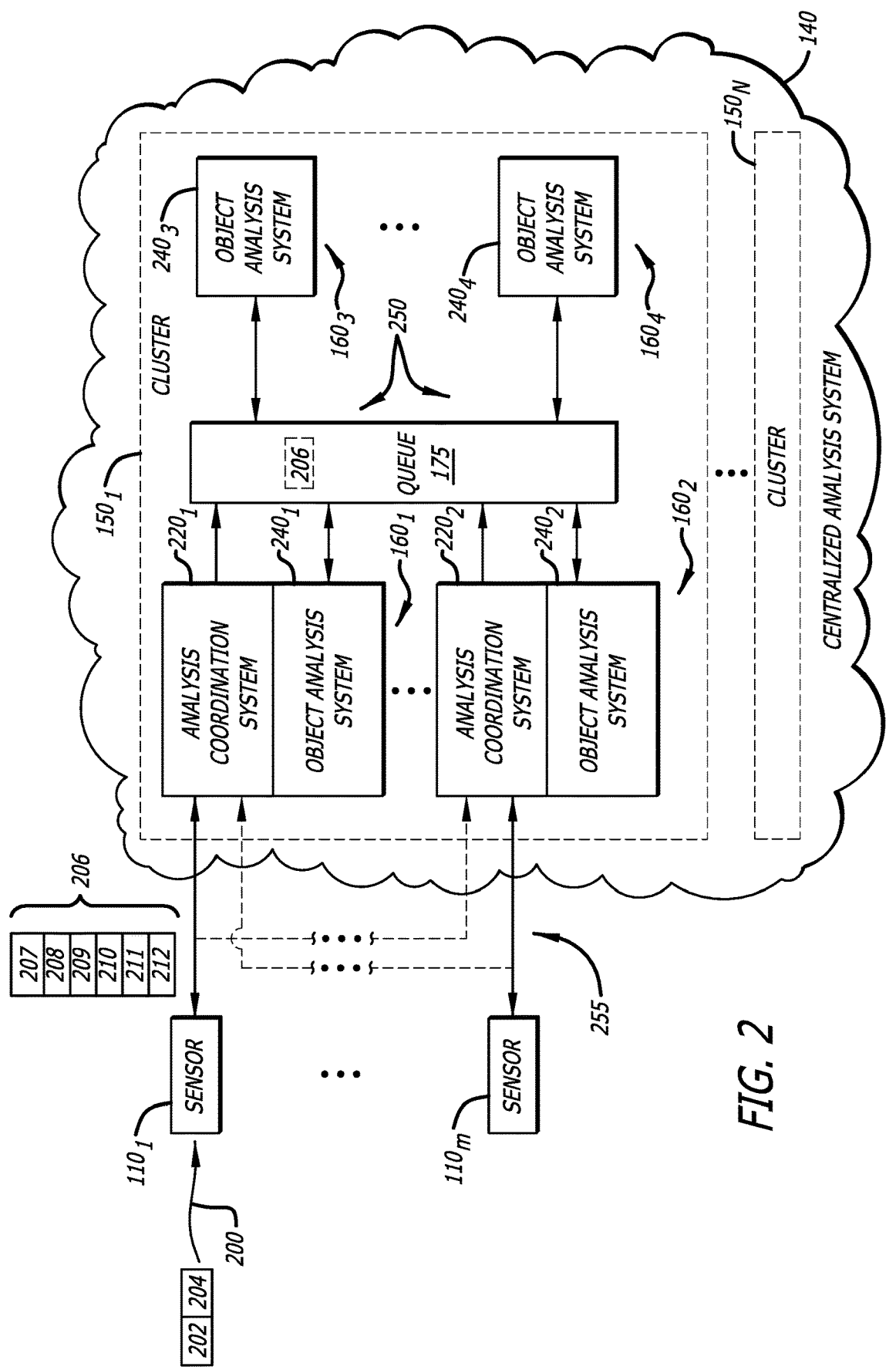
FIG. 2 is a first exemplary embodiment of logic implemented within a cluster operating as part of the centralized analysis system of FIG. 1 deploying an asynchronous load balancing architecture.

Referring now to FIG. 2, a first exemplary embodiment of logic implemented within the cluster $150_1$ that is operating as part of the centralized analysis system 140 of FIG. 1 is shown. The cluster $150_1$ comprises a plurality of computing nodes $160_1$-$160_P$, which are communicatively coupled to the distributed queue 175 (logical representation of the collective memory of queues $175_1$-$175_P$) over a first network 250. Each computing node (e.g., computing node $160_1$) comprises an analysis coordination system $220_1$ and an object analysis system $240_1$. The analysis coordination system $220_1$ may be activated or deactivated, where the computing node $160_1$ operates as a "broker" computing node when the analysis coordination system $220_1$ is activated or operates as an "analytic" computing node when the analysis coordination system $220_1$ is deactivated. As an alternative embodiment, it is contemplated that a "broker" computing node may have a logical architecture different than an "analytic" computing node. For example, a broker computing node may be configured with only an analysis coordination system. An analytic computing node may be configured with only an object analysis system.

Herein, each computing node $160_1$-$160_P$ may include one or more virtual machines (VMs) that can be provisioned with specific guest image instances selected on a per customer basis. The VM configurations may support one or more application versions and/or one or more operating system(s). Additionally, the VMs for each computing node may be provided for dedicated processing of a certain object type such as emails, network traffic including webpages/URLs, or the like.

According to this illustrative embodiment, sensors $110_1$-$110_M$ are communicatively coupled over a second network 255, which is different than the first network 250, to the first cluster $150_1$ via the broker computing nodes (e.g., computing node $160_1$ and computing node $160_P$). Each analysis coordination system $220_1$ and $220_2$ is configured to receive metadata from the sensors $110_1$-$110_M$, and based on the metadata, fetch corresponding objects for analysis. As an alternative, each analysis coordination system $220_1$ and $220_2$ may be configured to receive both the metadata and object from the sensors $110_1$-$110_M$.

More specifically, as shown, the malware detection system 100 features one or more sensors $110_1$-$110_M$, each sensor $110_1$-$110_M$ is configured to receive information that includes at least metadata 202 and a corresponding object

204. Upon receipt of the information 200, a sensor (e.g., sensor 110₁) separates the metadata 202 from the object 204 and conducts a preliminary analysis to determine whether the object 204 is suspicious (e.g., meets a first prescribed level of likelihood that the object is associated with malware). The preliminary analysis may include one or more checks (real-time analyses) being conducted on the metadata 202 and/or object 204 without execution of the object 204. Examples of the checks may include bit pattern comparisons of content forming the metadata 202 or object 204 with pre-stored bit patterns to uncover (i) deviations in messaging practices (e.g., non-compliance in communication protocols, message formats or ordering, and/or payload parameters including size); (ii) presence of content within the object that is highly susceptible to malicious attack; (iii) prior submission via the sensor 110₁ of certain types of objects (or an object that is highly correlated upon determining a shared amount of similar data) to a cluster for malware analysis, and if so, whether or not such malware analysis has been completed (e.g., completed, experienced timeout event, awaiting processing, etc.) or the like.

In the event that logic within the sensor 110₁ (e.g., processing engine 600 of FIG. 6) detects that a prior preliminary (or malware) analysis has been conducted on the object 204, in some instances, the sensor 110₁ may discontinue further analysis of the object 204, especially when the prior preliminary (or malware) analysis has determined that the object 204 is benign (e.g., not malicious) or malicious (e.g., determined to have some association with malware). For example, where the object 204 is an Uniform Resource Locator (URL) or another type of reference to dynamically changing data, the sensor 110₁ may routinely supply the metadata 202 to its associated broker computing node given the dynamic nature of content associated with the URL (or reference element). However, for other repeated malicious objects, the sensor 110₁ may report the results from the prior analysis to the management system 192 at an elevated level to identify a re-occurring malicious attack.

According to one embodiment of the disclosure, this preliminary analysis may involve a comparison between a representation of the object 204 (e.g., bit pattern representation as a hash of the object 204 or portions of the object 204, certain content of the object 204, etc.) and stored representations of previously analyzed objects. Optionally, the preliminary analysis may further involve a comparison between the representation of the object 204 and representations of other objects analyzed by the cluster 150₁ (or even other clusters) that have been determined to be benign (whitelist) or malicious (blacklist).

Additionally, based on a state of the prior preliminary analysis, the sensor 110₁ may refrain from supplying the metadata 202 to its associated broker computing node (e.g., computing node 160₁ or computing node 160₂) to avoid initiating an in-depth malware analysis of the object 204. As an illustrative example, the sensor 110₁ may refrain from supplying the metadata 202 when a prior submission has recently occurred and such analysis has not yet completed (and no timeout event has been detected). However, for Uniform Resource Locators (URLs) and other references to dynamically changing data, the presence of any prior preliminary analysis may not operate as a filter in determining whether to conduct a check as to whether the object 204 is suspicious.

In the event that no prior preliminary analysis of the object 204 has occurred (or occurrence with a timeout event) and the sensor 110₁ conducts a second real-time analysis of the object 204 to detect whether the object 204 is suspicious, but does not detect that the object 204 is suspicious, the sensor 110₁ may refrain from supplying the metadata 202 to its associated broker computing node. In other instances, however, the sensor 110₁ may supply at least a portion of the metadata 202 to its associated broker computing node when the object is determined to be suspicious based on the preliminary analysis.

In response to the sensor 110₁ detecting that the object 204 is suspicious, additional metadata may be added to the metadata 202 for storage, including a timeout period that is allocated based, at least in part, on characteristics of object 204 (e.g., object type). Metadata 202 and other metadata produced therefrom produces aggregated metadata 206, which is provided to one of the broker computing nodes (e.g., computing node 160₁) that is assigned to support the sensor 110₁ during a prior enrollment process and to initiate an in-depth malware analysis of the suspicious object 204. The aggregated metadata 206 may include (i) a sensor identifier (ID) 207 that identifies sensor 110₁ as the source of metadata 202 (e.g., a serial number, a device identifier such as a Media Access Control "MAC" address, an IP address, and/or another identifier unique to the cluster 150₁), (ii) a timestamp 208 that denotes a particular time during initial analysis of the suspicious object 204 (e.g., time of receipt, time of detection of suspiciousness, etc.), (iii) a timeout value 209 that denotes a total time remaining from an overall amount of time allocated for malware analysis of the object, (iv) representative content 210 of the suspicious object 204 (e.g., hash value, checksum, etc.), (v) object identifier 211, and/or (vi) an operation mode identifier 212 (e.g. active or passive). Other optional metadata may include, but is not limited or restricted to source or destination IP addresses, or the like.

In particular, a portion of the aggregated metadata 206 (generally referred to as "metadata 206") is analyzed by the analysis coordination system 220₁ to determine whether an identical object or a determined malicious object with similar metadata (e.g., from the same malicious source, etc.) has already been analyzed by any of the computing nodes 160₁-160₄. This may be accomplished by conducting a search of representative objects within the distributed data store 170 as shown in FIG. 1. If so, the results of the analysis are returned to the sensor 110₁. If not, the metadata 206 is loaded into the distributed queue 175 (e.g., queue 175₁). The metadata 206 in the queue 175₁ may be accessible by any of the object analysis systems 240₁-240₄ of the computing nodes 160₁-160₄, where the metadata 206 identifies the location of the suspicious object 204 that is fetched for further analysis. According to this embodiment, the analysis coordination systems 220₁ and 220₂ have no involvement in the routing of metadata to a particular object analysis system.

As shown in FIG. 2, the difference between the "broker" computing nodes 160₁ and 160₂ and the analytic computing nodes 160₃ and 160₄ is whether or not the analysis coordination systems have been deactivated. Herein, for the "broker" computing nodes 160₁ and 160₂, analysis coordination systems 220₁ and 220₂ have been activated while the analysis coordination systems (not shown) for computing nodes 160₃ and 160₄ have been deactivated. It is noted, however, that all of the computing nodes 160₁-160₄ within the same cluster 150₁ feature an object analysis system 240₁-240₄, respectively. Each of these object analysis systems 240₁-240₄ includes logic that is capable of conducting an in-depth malware analysis of the object suspicious 204 upon determining to have sufficient processing capability.

More specifically, each object analysis system $240_1$-$240_4$, when determined to have sufficient processing capability or otherwise determined to have suitable analytical capabilities to meet the required analysis, accesses the queue 175 to obtain metadata associated with a suspicious object awaiting malware analysis. For example, during operation, the object analysis system $240_1$ may periodically and/or aperiodically (e.g., in response to completion of a prior malware analysis) access the queue 175 and obtain the metadata 206 associated with the suspicious object 204. Responsive to obtaining the metadata 206, the object analysis system $240_1$ accesses a portion of the metadata 206 to locate the storage location of the suspicious object 204, and thereafter, fetches the suspicious object 204. The suspicious object 204 may be stored in the sensor $110_1$, in the computing node $160_1$ or in an external network device (not shown).

Upon receipt of the suspicious object 204, the object analysis system $240_1$ conducts an in-depth malware analysis, namely any combination of behavior (dynamic) analysis, static analysis, or object emulation in order to determine a second level of likelihood (probability) of the suspicious object 204 being associated with malware. The second level of likelihood is at least equal to and likely exceeding (in probability, in computed score, etc.) the first level of likelihood.

As shown, the analysis coordination system $220_1$ is configured to receive metadata associated with specific objects and provide information, inclusive of some or all of the metadata, to the queue 175. Thereafter, the analysis coordination system $220_1$ has no involvement in the routing of such metadata to any of the object analysis systems $240_1$-$240_4$ of the computing nodes. An object analysis system $240_1, \ldots,$ or $240_4$ is configured to fetch metadata that is stored in the queue 175 when that object analysis system is determined to have sufficient processing capability to handle a deeper level analysis of the object.

Figure 3:
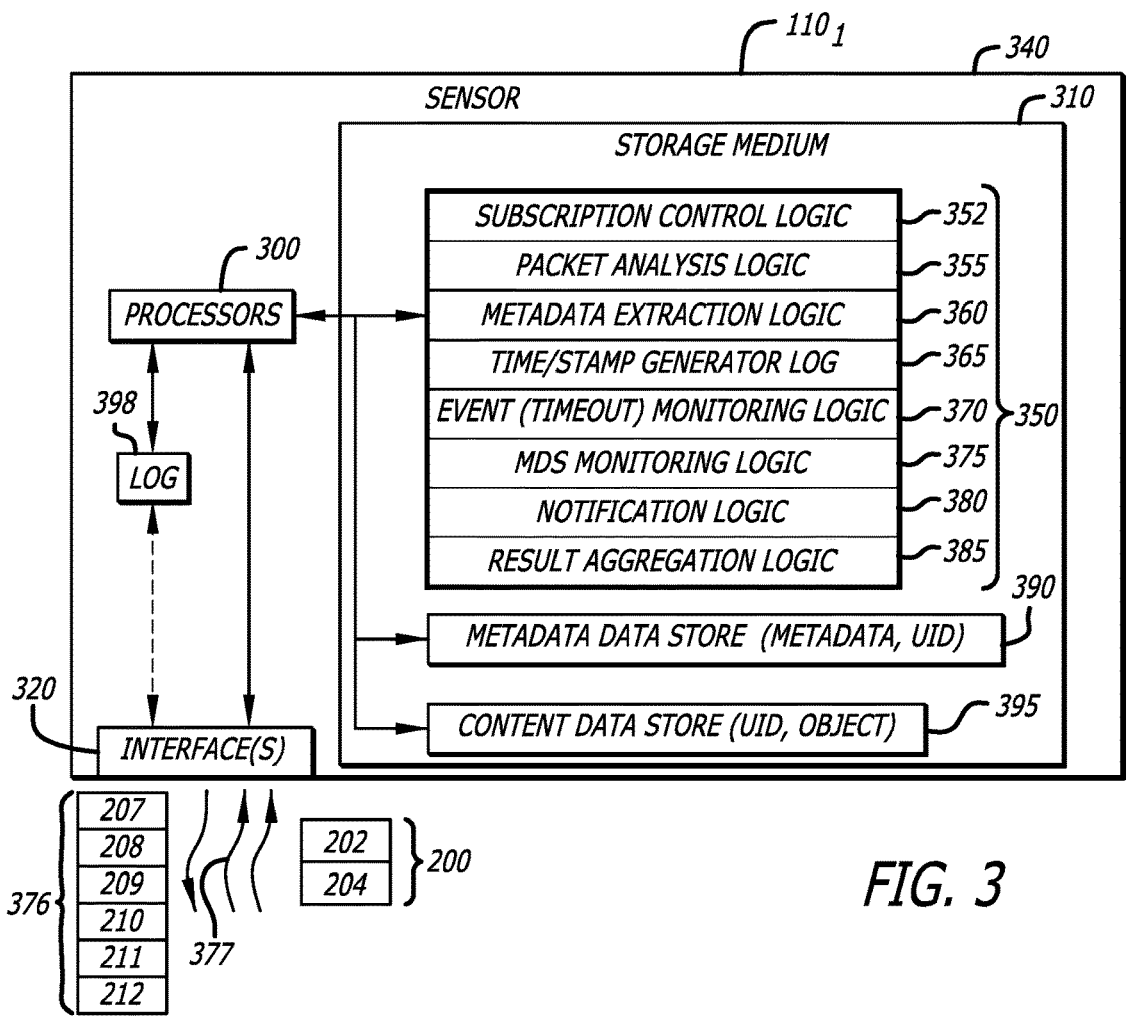
FIG. 3 is a block diagram of an exemplary embodiment of logic implemented within a sensor deployed within the malware detection system of FIG. 1.

Referring to FIG. 3, a block diagram of an exemplary embodiment of logic implemented within the sensor $110_1$ deployed within the malware detection system 100 of FIG. 1 is shown. According to this embodiment of the disclosure, the sensor $110_1$ comprises one or more hardware processors 300 (referred to as "processor(s)"), a non-transitory storage medium 310, and one or more network interfaces 320 (referred to as "network interface(s)"). These components are at least partially encased in a housing 340, which may be made entirely or partially of a rigid material (e.g., hard plastic, metal, glass, composites, or any combination thereof) that protects these components from environmental conditions. Where the sensor $110_1$ is software, the interface may operate as an interface to an Application Programming Interface (API) for example.

The processor(s) is a multi-purpose, processing component that is configured to execute logic 350 maintained within the non-transitory storage medium 310 that is operating as a data store. As described below, the logic 350 may include, but is not limited or restricted to, (i) subscription control logic 352, (ii) packet (object) analysis logic 355, (iii) metadata extraction logic 360, (iv) timestamp generator logic 365, (v) events (timeout) monitoring logic 370, (vi) metadata data store (MDS) monitoring logic 375, (vii) notification logic 380, and/or (viii) result aggregation logic 385. One example of processor(s) 300 include an Intel® (x86) central processing unit (CPU) with an instruction set architecture. Alternatively, processor(s) 300 may include another type of CPUs, a digital signal processor (DSP), an Application Specific Integrated Circuit (ASIC), a field-programmable gate array (FPGA), or any other hardware component with data processing capability.

According to one embodiment of the disclosure, the sensor $110_1$ may include subscription control logic 352 that controls the signaling (handshaking) with an enrollment service (e.g., within the management system 192 of FIG. 1). Such signaling enables the sensor $110_1$ to join a cluster as well as support continued communications with an enrollment service (e.g., within the management system 192 of FIG. 1) to re-evaluate whether the sensor $110_1$ should remain in communication with a particular cluster. Additionally, the subscription control logic 352 instance, may detect maintain information associated with the subscription expiration time that, if not extended to a renewal, disables communications with the assigned cluster and potentially signals a customer of renewal payments necessary to continue the subscription (or upgrade to a higher subscription level).

As shown, the network interface(s) 320 is configured to receive the information 200, including metadata 202 and object 204, directly from the network or via a network tap. The information 200 may be temporarily stored prior to processing. Herein, upon receiving the information 200, the processor(s) 300 (e.g., packet analysis logic 355) may conduct an analysis of at least a portion of the information 200, such as the object 204 for example, to determine whether the object 204 is suspicious.

Upon detecting the object 204 is suspicious, the processor 300 processes the metadata extraction logic 360 that, during such processing, extracts the metadata 202 from the received information 200 and assigns the object identifier 211 for the metadata 202 and the suspicious object 204, which may be unique for the cluster (referred to as "universally unique identifier" or "UUID"). The metadata 202 along with other information is stored in a metadata data store 390. The suspicious object 204, UUID 211 along with certain information associated with the suspicious object 204 may be stored in a content data store 395. The content data store 395 may be part of the non-transitory storage medium 310 of the sensor $110_1$. It is contemplated, however, that the content data store 395 may be stored externally from the sensor $110_1$ in another network device.

In response to detecting the storage of the metadata 202 in the metadata data store 390, the MDS monitoring logic 375 accesses the metadata data store 390 to obtain at least a portion of the aggregated metadata 206. The portion of the metadata 206 may include (i) a sensor identifier 207, (ii) a timestamp 208, (iii) the timeout value 209, (iv) a representation 210 of the suspicious object 204 (e.g., hash value, checksum, etc.), (v) UUID 211, and/or (vi) the operation mode identifier 212 (e.g. active or passive), as illustrated. Thereafter, the MDS monitoring logic 375 determines a (remaining) timeout value, which represents an amount of time allocated for analyzing the object 204 for malware that still remains, and provides the metadata 206 to the cluster $150_1$. The MDS monitoring logic 375 may use the timeout period assigned to the object 204 and timestamp 208 to produce the timeout value 209, representing an amount of the time period that is remaining to complete malware analysis of the object 204. Thereafter, the MDS monitoring logic 375 generates a request message 376, including the portion of the metadata 206, to send to an analysis coordination system associated with a broker computing node that is assigned to service the sensor $110_1$.

Additionally, the UUID 211 along with certain information associated with suspicious object 204 may be stored in a content data store 395. The content data store 395 may include a data store that is part of the non-transitory storage medium 310 of the sensor $110_1$. It is contemplated, however, that the content data store 395 may be stored on the computing node $160_1$, or stored externally from the sensor $110_1$ in another network device.

For a certain type of object, such as the suspicious object 204 being a file for example, the file and its related UUID are collectively stored in the content data store 395. For another type of object, such as a URL or a document with an embedded script for example, the URL (or document with the embedded script) along with information associated with network traffic pertaining to the URL (or document with embedded script) may be collectively stored with its related UUID. The information associated with the network traffic may include information associated with web pages accessed via the URL (or script) over a period of time (e.g., during a communication session, portion of a communication session, etc.).

Additionally, the sensor $110_1$ comprises timestamp generator logic 365, which is configured to receive a time value from a source clock (e.g., real-time clock, not shown) and generate a timestamp based on the clock value and the received information 200. For instance, according to one embodiment of the disclosure, the timestamp generator logic 365 generates a timestamp once the packet analysis logic 355 determines that the object 204 is suspicious (and no prior preliminary analysis of the object 204 precludes continued analysis of the object 204 as described above). Of course, it is contemplated that the timestamp generator logic 365 may be configured to generate the timestamp in response to extraction of the metadata by the metadata extraction logic 360 or storage of the suspicious object 204 with the content data store 395.

The sensor $110_1$ further includes notification logic 380, which is responsible for handling communications 377 with particular logic within the computing node $160_1$, namely sensor notification logic (see FIG. 5A) or reporting logic (see FIG. 5B). Such communications 377 may include (i) analysis results 595 from reporting logic of an object analysis system or (ii) information 596 from the sensor notification logic 520 that signifies (a) the suspicious object 204 has already been analyzed or (b) a timeout event has been detected for the portion of the metadata 206 residing in the queue $175_1$ that originated from the sensor $110_1$.

As an illustrative example, in response to receipt of communications from the sensor notification logic, which may include the UUID 211 for the suspicious object 204, the sensor identifier and the unique identifier of a previously analyzed object, the notification logic 380 may access the metadata data store 390 in order to identify that the suspicious object 204 has been processed (e.g., set a timeout indicator associated with an entry of the metadata data store 390 that includes the suspicious object 204). Although not shown, the notification logic 380 may further notify the event (timeout) monitoring logic 370 that analysis of the suspicious object 204 has been completed and no timeout events have occurred.

Referring to both FIG. 2 and FIG. 3, when the "broker" computing node $160_1$ for the sensor $110_1$ is operating in a passive mode, as provided by the operation mode identifier 212, the result aggregation logic 385 of the sensor $110_1$ may periodically or aperiodically (e.g., in response to a timeout event) access the distributed data store $170_1$ for analysis results or timeout events. The access may be based, at least in part, on the UUID 211. Alternatively, when the "broker" computing node $160_1$ is operating in an active mode, the timeout events associated with suspicious objects detected the sensor $110_1$ may be provided from event (timeout) monitoring logic within the broker computing node $160_1$ to the notification logic 380 of the sensor $110_1$. Also, the results of an in-depth malware analysis of the suspicious object 204 may be provided to the notification logic 380 of the sensor $110_1$ from reporting logic of the computing node handling the in-depth malware analysis (e.g., "broker" computing node $160_1$ or another computing node) as well as timeout events detected by the computing node handling the in-depth malware analysis. The notification logic 380 may provide the results of the in-depth malware analysis to metadata data store 390 and/or content data store 395 for storage or may store data to signify completion of the analysis or an occurrence of a timeout event that denotes expiration of the time allocated for conducting malware analysis of the suspicious object 204.

In response to neither the notification logic 380 nor the result aggregation logic 385 receiving information that conveys the suspicious object 204 has been analyzed before a timeout period has elapsed (e.g., no analysis results have been uploaded into the distributed data store $170_1$ of FIG. 1 or provided to notification logic 380), the event (timeout) monitoring logic 370 determines that the timeout event has occurred and notifies the processor 300 of the timeout event. Normally, the processor(s) 300 record information associated with the timeout event into a log 398 that maintains analytic data associated with sensor operations (e.g., number of timeout events, number of objects offered for analysis by the sensor $110_1$, etc.). Data, including the stored analytic data, may be sent as messages by the processor(s) 300 to the management system or directly to network administrators at an enterprise being monitored by sensor $110_1$. It is contemplated, however, that the processor(s) 300 may decide to resubmit the suspicious object 204, where the decision may be based on the type of object and/or the level of suspiciousness associated with that object.

Figure 4:
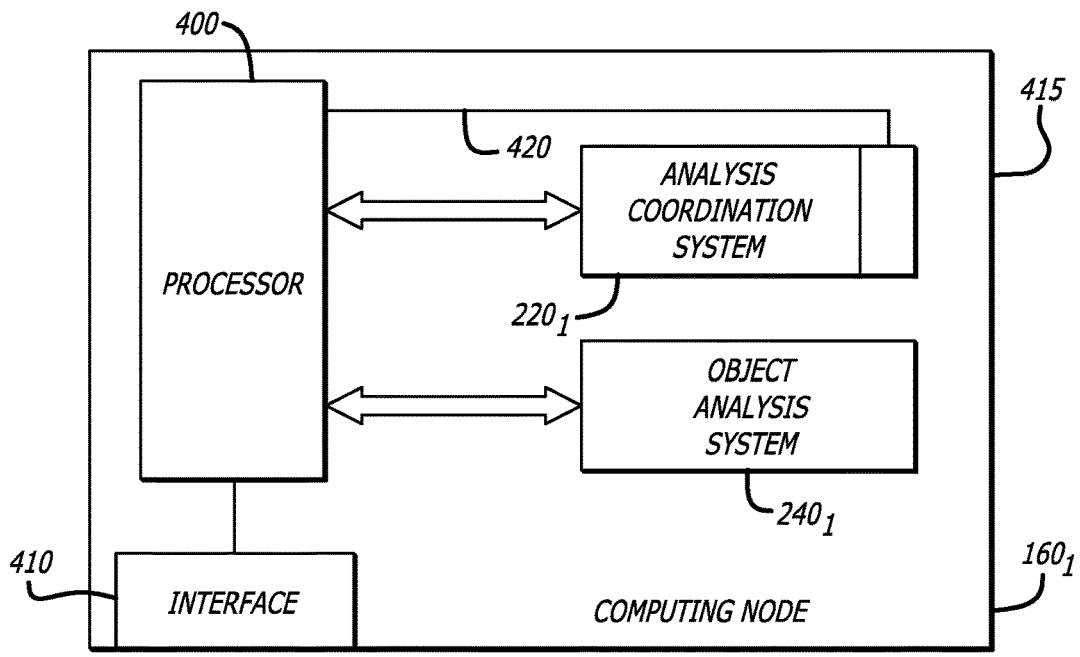
FIG. 4 is a block diagram of an exemplary embodiment of logic implemented within a computing node configured in accordance with an asynchronous load balancing architecture.

Referring now to FIG. 4, a block diagram of an exemplary embodiment of logic implemented within the computing node $160_1$ that is operating as part of the centralized analysis system 140 of FIG. 1 is shown. Herein, the computing node $160_1$ comprises one or more processors 400, one or more network interfaces 410, logic associated with the analysis coordination system $220_1$ and logic associated with the object analysis system $240_1$. These components are at least partially encased in a housing 415, which may be made entirely or partially of a rigid material (e.g., hard plastic, metal, glass, composites, or any combination thereof) that protects the components from environmental conditions.

As shown, the processor(s) 400 is figured to activate or deactivate the analysis coordination system $220_1$ as illustrated by a control line 420. When the analysis coordination system $220_1$ is activated, the processor(s) 400 supports communications between the analysis coordination system $220_1$ and any enrolled sensors (e.g., sensor $110_1$). The contents of the analysis coordination system $220_1$ are shown in FIG. 5A.

Referring to FIG. 5A, a block diagram of an exemplary embodiment of logic implemented within an analysis coordination system $220_1$ that is operating as part of the computing node $160_1$ of FIG. 4 is shown. Herein, according to one embodiment of the disclosure, the analysis coordination system $220_1$ features a local storage medium that includes logic, such as request detector/ID generator logic 500, filtering (pre-analysis) logic 510, and sensor notification logic 520 for example, that relies on processing functionality provided by the processor(s) 400 and connectivity provided by the network interface(s) 410 of the computing node $160_1$. Of course, it is contemplated that the analysis coordination system $220_1$ may be configured to utilize a different processor, such as one or more different processor cores for example, than the object analysis system $240_1$ within the same computing node $160_1$. Additionally, the analysis coordination system $220_1$ includes a portion of the local storage medium that operates as part of the distributed data store $170_1$ (as shown) or has access to the distributed data store $170_1$ hosted within a separate memory device as shown in FIG. 1. As stated above, the distributed data store $170_1$ is accessible by each and every analysis coordination system within the cluster $150_1$ that is activated (e.g., analysis coordination systems $220_1$-$220_2$ of FIG. 4).

The request detector/ID generator logic 500 is configured to detect the request message 376 with the metadata 206 from the MDS monitoring logic 375 of FIG. 3 and provide the metadata 206 to the pre-analysis (filtering) logic 510. Identified by dashed lines, it is contemplated that the detector/ID generator logic 500 may be adapted to generate a response message that returns the unique identifier (UUID) for the metadata 206 and the suspicious object 204 to the MDS monitoring logic 375 if the sensor $110_1$ does not feature logic to generate an object identifier.

The pre-analysis (filtering) logic 510 determines whether the metadata associated with a suspicious object for analysis corresponds to any previously analyzed suspicious object. This determination may involve a comparison of representative content 210 of the suspicious object 204, which is included as part of the received metadata 206, against representative content 535 of previously analyzed suspicious objects stored in the distributed data store 170, including distributed data store $170_1$. The representative content 210 of the suspicious object 204 may include a checksum or a hash value of the suspicious object 204. It is contemplated that the representative content 210 may include other parameters such as an indicator of a timeout event has occurred during processing of the suspicious object 204 or the original name of the object, especially when the suspicious object 204 is a file. The presence of other parameters may be useful in reducing the chances of false negatives in such detection.

Additionally, it is contemplated that the pre-analysis (filtering) logic 510 may be configured to identify one or more characteristics of the suspicious object 204, and based on the characteristic(s), determine whether further in-depth malware analysis of the suspicious object 204 is not desired in order to reduce workload. For example, the metadata 206 may provide information that identifies the suspicious object 204 is a type of object for which further in-depth malware analysis is not currently targeting or has little significance when compared to other types of objects. As another example, the metadata 206 may identify that the suspicious object 204 originated from a trusted source. Yet as another example, the metadata 206 may identify that the suspicious object 204 is associated with a particular software profile that is different from objects with certain software profiles that are now more frequently under attack. This determination may involve a comparison of the sensor ID 207 and/or the representative content 210 of the suspicious object 204, which is included as part of the received metadata 206, against content 535 stored in the distributed data store 170, including distributed data store $170_1$.

In response to determining that the representative content 210 associated with the suspicious object under analysis compares to representative content 535 of a previously analyzed object, the sensor notification logic 520 signals the notification logic 380 of FIG. 3 within the sensor $110_1$ that the suspicious object 204 has already been processed (or no in-depth, behavioral malware analysis is of interest at this time). Such signaling may include the UUID 211 and sensor ID 207 associated with the metadata 206 being processed by the pre-analysis (filtering) logic 510 and the UUID 540 associated with the previously analyzed object. Thereafter, the results 545 of the analysis may be obtained by the sensor $110_1$ from the distributed data store $170_1$ utilizing the UUID 540 associated with the previously analyzed object or received via the object analysis system conducting an analysis of the suspicious object 204. It is contemplated that, for types of suspicious objects (e.g., URLs), in-depth malware analyses are conducted even when the representative content 210 associated with the suspicious object 204 compares to representative content 535 of a previously analyzed object. This occurs because the content of websites is dynamic. For these cases, the pre-analysis (filtering) logic 510 may bypass the above-described operations and store a portion of the metadata 206 in the queue $175_1$.

In response to determining that the representative content 210 associated with the suspicious object 204 under analysis fails to compare to any representative content associated with previously analyzed objects stored in the distributed data store 170, the pre-analysis (filtering) logic 510 records the UUID 211 along with the representative content 210 and the sensor ID 207 that are provided as part of the metadata 206 into the distributed data store $170_1$. The results of the analysis are subsequently uploaded to a corresponding entry associated with the UUID 211 at a later time after completion of the malware analysis of the suspicious object 204. The results may be referenced by other analysis coordination systems (analysis coordinators) within the cluster to mitigate unnecessary workload.

The timeout monitoring logic 530 is responsible for monitoring at least two different types of timeout events at the queue $175_1$. For a first type of timeout event, namely the object 204 failing to undergo malware analysis by a prescribed timeout period and, the timeout monitoring logic 530 utilizes the timeout value 209 provided as part of the queued metadata 206. The timeout value 209 generally synchronizes timing in the monitoring of timeout events by the object analysis system $240_1$ and the sensor $110_1$. For this type of timeout event, the timeout monitoring logic 530 monitors the metadata queuing time for the metadata 206 associated with the object 204 to determination where this duration exceeds the timeout value 209 (e.g., the duration that the metadata 206 resides in the queue $175_1$ exceeds the timeout value 209). For the second type of timeout event, the timeout monitoring logic 530 monitors the metadata queuing time for the object 204, where the duration exceeds a prescribed threshold, the timeout monitoring logic 530 may initiate actions that cause the metadata 206 to be made available to other object analysis systems. The timeout monitoring logic 530 is communicatively coupled to the distributed data store $170_1$ and the sensor notification logic 520 to identify whether metadata 206 experienced a timeout event.

Referring back to FIG. 2, each object analysis system $240_1$-$240_4$ of the computing nodes $160_1$-$160_4$ is responsible for retrieval of metadata that denotes a suspicious object awaiting an in-depth malware analysis to be conducted thereon. Furthermore, upon retrieval of the suspicious object, the object analysis system $240_1$, . . . , or $240_4$ is responsible for conducting the malware analysis on the suspicious object. A logical representation of an object analysis system, such as object analysis system $240_1$ for example, is shown in FIG. 5B.

Referring to FIG. 5B, a block diagram of an exemplary embodiment of logic implemented within the object analysis system 240₁ that is operating as part of the computing node 160₁ of FIG. 4 is shown. According to one embodiment of the disclosure, the object analysis system 240₁ features logic, namely management logic 550, object processing logic 570 and reporting logic 590, that relies on processing functionality provided by the processor(s) 400 and connectivity provided by the network interface(s) 410 of the computing node 160₁. Of course, it is contemplated that the object analysis system 240₁ may be configured to utilize a different processor, such as one or more different processor cores for example, than the analysis coordination system 220₁ operating within the same computing node 160₁. As shown, the management logic 550 includes capacity determination logic 560, queue access logic 562, and content retrieval logic 564. The object processing logic 570 includes control logic 580 that orchestrates operations conducted by the static analysis logic subsystem 582, behavior analysis logic subsystem 584, emulation analysis logic subsystem 586, and correlation/classification logic 588.

Herein, the capacity determination logic 560 is responsible for determining whether the computing node 160₁ featuring the object analysis system 240₁ has sufficient processing capacity to handle another in-depth malware analysis of a suspicious object. This may involve a checking of current processor workload, the number of virtual machines available for behavioral analysis of the suspicious object, or the like. If no sufficient resources, the capacity determination logic 560 refrains from notifying the queue access logic 562 to access metadata within the distributed queue 175. If so, the capacity determination logic 560 notifies the queue access logic 562 to commence selection of metadata from the distributed queue 175 of FIG. 2. The selection may be based on a First-In-First-Out (FIFO) queue selection scheme where the oldest metadata awaiting processing by an analysis system is selected. Of course, it is contemplated that the selection scheme may be arranged in accordance with factors in addition to or other than capacity such as a level of suspiciousness of the object, anticipated object type, type of communications being monitored (e.g., email, network traffic, etc.), service levels (QoS) associated with the sensor or analysis coordination system as identified by the metadata, sensor priority where certain sensors may be located to protect certain highly sensitive resources within the enterprise network, user-specified priority based on selected object characteristics, geographic location of the computing node 160₁ in relation to the sensor that captured the metadata (in the same region, state, country, etc.) as may be required by privacy laws or service level agreements, or the like.

One feature of the asynchronous load balancing architecture provides an implicit synchronization among the computing nodes 160₁-160ₚ across the cluster 150₁, notably synchronization of the object analysis systems 240₁-240ₚ without the need for synchronized load balancers. In particular, once an object analysis system 240₁ removes a metadata entry from queue 175₁ of the distributed queue 175 is reflected in the other queues 175₂-175ₚ (when configured to store the same information). Hence, other object analysis systems 240₂-240ₚ of the cluster 150₁ will become aware of the removal. According to one embodiment, the "removed" entry may be set to a state that precludes other object analysis systems from accessing metadata within the "removed" entry so that the next available entry of the distributed queue 175 in accordance with the selection scheme is accessed for processing. It is noted that, where processing of the object associated with the metadata does not complete within a prescribed period of time (e.g., the object analysis system fails during processing, etc.), it is contemplated that the "removed" entry may be returned to a state that allows another object analysis systems 240₂-240ₚ to access that metadata with that restored entry.

Also, queue access logic 562 may include timeout monitor logic 563 that determines whether the metadata removed from the distributed queue 175 has experienced a timeout. If so, the timeout monitor logic 563 provides the UUID and sensor ID associated with the metadata to the reporting logic 590 via communication path 568 to bypass in-depth malware analysis of the suspicious object by the object processing logic 570. In response, the reporting logic 590 is configured to provide information 591 associated with the timeout event (hereinafter "timeout event information 591") to the distributed data store 170 and/or the notification logic 380 of the sensor 110₁ of FIG. 2 when the object analysis system 240₁ is operating in active mode.

Upon receipt of the selected metadata, the content retrieval logic 564 commences retrieval of the suspicious object corresponding to the metadata. This retrieval may be accomplished by obtaining the sensor ID 207 that indicates what sensor is responsible for the submission of the retrieved metadata and storage of the object, along with the UUID provided by the metadata for identifying the object corresponding to the metadata. A request message 565 is sent to the sensor including the sensor identifier 207 and UUID 211 as parameters. A response message 566 may be returned from the sensor, where the response message 566 includes a link to the suspicious object (from which the suspicious object may be accessed), such as IP addresses, URLs, domain names, or the suspicious object itself (i.e., object 204). Although this illustrative embodiment describes the object analysis system 240₁ acquiring the suspicious object 204 directly from the sensor 110₁, it is contemplated that all communications with the sensor 110₁ may be coordinated through the analysis coordination system (e.g., system 220₁) of the broker computing node in communication with sensor 110₁

Thereafter, the returned information (link to object or object 204) may be temporarily stored in a data store (not shown) awaiting processing by one or more of the static analysis logic subsystem 582, the behavior analysis logic subsystem 584, and/or the emulation analysis logic subsystem 586. The control logic 580 controls the processing of the suspicious object 204 as described below for FIG. 7. The results of the malware analysis being conducted through the processing of the object by one or more of the static analysis logic subsystem 582, the behavior analysis logic subsystem 584, and/or the emulation analysis logic subsystem 586 are provided to the correlation/classification logic 588. The correlation/classification logic 588 receives the results and determines whether the results denote that the likelihood of the suspicious object 204 being associated with malware exceeds a second prescribed threshold. If so, the suspicious object 204 is determined to be malicious. Otherwise, the suspicious object 204 is determined to be non-malicious.

The analytic results from the correlation/classification logic 588 along with certain portions of the metadata associated with the object (e.g., UUID 211) are provided to the reporting logic 590. The reporting logic 590 may be responsible for generating alerts directed to the client administrators or management system as shown in FIG. 1. Additionally, or in the alternative, the reporting logic 590 may be responsible for providing at least a portion of the analytic results 595 to the distributed data store 170 for storage in accordance with the UUID associated with the analyzed, suspicious object. The sensor 110₁ may gain access the stored analytic results 595 and provide the alerts to the network administrator 190 as illustrated in FIG. 1 or may forward the analytic results 595 to the management system 192 that may issue the alerts as well as distribute threat signatures generated by (or based on data supplied from) the object processing logic 570.

Referring to FIG. 6, a flow diagram of operations conducted by an exemplary embodiment of logic implemented within the sensor $110_1$ and the computing node $160_1$ is shown. Herein, the processing engine 600 of the sensor $110_1$ is configured to receive the information 200, including the metadata 202 and the object 204, directly from the network or via a network tap. Although not shown, the information 200 may be temporarily stored prior to processing. The processing engine 600 includes the packet analysis logic 355, metadata extraction logic 360 and the timestamp generator logic 365 of FIG. 3.

After receipt of the information 200, the processing engine 600 (e.g., logic 355-365 of FIG. 3) conducts an analysis of at least a portion of the information 200, such as the object 204 for example, to determine whether the object 204 is suspicious. If so, the processing engine 600 (metadata extraction logic 360 of FIG. 3) extracts the metadata 202 from the received information 200 and may assigns UUID 211 to the metadata 202. Furthermore, the processing engine 600 may include logic, such as a feature of timestamp generation logic 365 or a separate timeout period computation logic (not shown), which determines a timeout period allocated to conduct a malware analysis on the object 204 (e.g., seconds, minutes or hours). Some of the metadata 202 along with additional information (e.g., sensor ID, etc.), which forms part of the (aggregated) metadata 206, may be stored in the metadata data store 390 while the suspicious object 204 may be stored in the content data store 395. The metadata extraction logic 360 relates the UUID 211 with the suspicious object 204.

Additionally, logic within the processing engine 600 (e.g., timestamp generator logic 365 of FIG. 3) is configured to generate a timestamp with receipt of the information 200. For instance, according to one embodiment of the disclosure, logic within the processing engine 600 (e.g., timestamp generator logic 365) may generate a timestamp upon determining that the object 204 is suspicious. Of course, the point of time when the timestamp is generated may vary anywhere between initial detection of the information 200 by the sensor $110_1$ and the fetching of the metadata 202 by the MDS monitoring logic 375. The occurrence of a timeout event is based on a period of time (timeout period) that has elapsed and no information (received or fetched) identifies that a malware analysis for a particular object has occurred, where the duration of the timeout period may be fixed or may vary depending on the type of content under analysis (e.g., object type). For example, the timeout period may be fixed for certain object types or all object types. Alternatively, the timeout period may be dynamic that provides flexibility for increasing or decreasing the timeout period of time based on findings or service subscription levels or customer needs. It is contemplated that the timeout period may be initially stored as part of the metadata associated with object 204, while the timeout value 209 (remaining amount of timeout period for analysis of the object 204) may be provided to the cluster.

The MDS monitoring logic 375 may be configured to poll the metadata data store 390 for newly stored metadata (e.g., metadata 206). In response to detecting storage of the metadata 206 in the metadata data store 390, the MDS monitoring logic 375 fetches at least a portion of the metadata 206 for forwarding to the analysis coordination system $220_1$ of the computing node $160_1$ and computes the timeout value 209 based on the timeout period. This portion of the metadata 206 may include, but is not limited or restricted to the following: (i) the sensor ID 207 for sensor $110_1$, (ii) the timestamp 208 that identifies a start time for the analysis of the suspicious object 204, (iii) the assigned timeout value 209 (e.g., a time remaining from a time assigned by the processing engine that is based, at least in part, on the object type), (iv) representative content 210 of the suspicious object 204 (e.g., hash value, checksum, etc.), (v) UUID 211 of the suspicious object, and/or (vi) the operation mode identifier 212. Thereafter, the MDS monitoring logic 375 generates a request message 376, including some or all of the metadata 206, to the analysis coordination system $220_1$ that is assigned to service the sensor $110_1$.

The request detector/ID generator logic 500 is configured to receive the request message 376 from the MDS monitoring logic 375 and provide the metadata 206 to the pre-analysis (filtering) logic 510. It is contemplated that, in response to providing the request message 376 to the request detector/ID generator logic 500, the request detector/ID generator logic 500 may additionally assign a UUID associated with at least a portion of the metadata 206 and return the UUID to the MDS monitoring logic 375. Thereafter, the MDS monitoring logic 375 would relate the UUID to the metadata 206, where such metadata and its relationship are stored in the metadata data store 390.

As shown, the request detector/ID generator logic 500 of the analysis coordination system $220_1$ provides the metadata 206 to the pre-analysis (filtering) logic 510. Herein, the pre-analysis (filtering) logic 510 determines, from content within the metadata 206, whether the suspicious object 204 corresponds to any previously analyzed suspicious object within the cluster $150_1$ or perhaps within other clusters $150_2$-$150_N$ where the distributed data store $170_1$ is updated based on stored content in other computing nodes $160_2$-$160_P$ or computing nodes in other clusters $150_2$-$150_N$. This determination involves a comparison of representative content 210 (e.g., checksum, hash value, etc.) UUID 211 (or original object name) of the suspicious object 204, which is part of the metadata 206, against representative content of previously analyzed suspicious objects stored in the distributed data store 170.

In response to determining that the representative content 210 for the suspicious object 204 compares to representative content of a previously analyzed object, the pre-analysis (filtering) unit 510 signals the sensor notification logic 520 to transmit a message to the notification logic 380 within the sensor $110_1$ that signifies that the suspicious object 204 has already been processed. The message may include the UUID 211 and sensor ID 207 associated with the metadata 206 being processed by the pre-analysis (filtering) logic 510 and the UUID associated with the previously analyzed object. Thereafter, the results of the analysis may be obtained from the distributed data store 170 utilizing the UUID associated with the previously analyzed object.

Responsible for handling communications with the sensor notification logic 520 and upon receipt of communications from the sensor notification logic, the notification logic 380 uses the UUID 211 of the suspicious object 204 to access the metadata data store 390 to indicate that the suspicious object 204 has been processed and notify the event (timeout) monitoring logic 370, through modification of an entry associated with the metadata 206 corresponding to object 204 in metadata data store 390 that analysis of the suspicious object 204 has been completed. The result aggregation logic 385 may be configured to periodically or aperiodically (e.g., in response to a timeout event) send a request message to retrieval logic 525 to access the distributed data store 170 for results associated with the suspicious object 204 corresponding to the UUID 211.

However, in response to determining that the representative content 210 of the suspicious object 204 under analysis fails to compare to any representative content within the distributed data store 170, the pre-analysis (filtering) logic 510 creates a storage entry associated with the suspicious object 204, including the UUID 211 along with the representative content 210 and the sensor ID 207 that are provided as part of the metadata 206 into the distributed data store 170. The results of the analysis are subsequently uploaded into this storage entry after completion of the malware analysis of the object.

In the event that the timeout monitoring logic 370 detects a timeout event, which signifies that the suspicious object 204 has not been analyzed by an analysis system before a timeout period has elapsed (e.g., the result aggregation logic 385 has not been able to retrieve analytic results 595 associated with the suspicious object 204 from the distributed data store $170_1$ when broker computing node $160_1$ is operating in passive mode), the timeout monitoring logic 370 notifies the processing engine 600 of the timeout event.

Additionally, the notification logic 380 may be adapted to signify a timeout event (or failure to analyze the suspicious object 204 associated with provided metadata 206 within a prescribed period of time that may be determined based on the timeout period, the timestamp 208 and/or the current clock value) in response to receipt of timeout event information 591 when broker computing node $160_1$ is operating in active mode or receipt of information 532 that identifies metadata associated with suspicious object 204 has not been timely processed. This information (or portion thereof) 534 may also be provided for storage with the distributed data store 170 (via distributed data store $170_1$), which is accessible by other computing nodes $160_2$-$160_P$.

Herein, the processing engine 600 may record information associated with the timeout event into the log 398, which maintains analytic data associated with the sensor operations (e.g., number of timeout events, number of objects offered for analysis by the sensor $110_1$, etc.). Alternatively, the processing engine 600 may resubmit the suspicious object 204, which may be accomplished, for example, by toggling a flag associated with a storage entry for the metadata 206 that causes the metadata 206 to appear as being newly added to the metadata data store 390. The MDS monitoring logic 375 would commence fetching a portion of the metadata 206, as described above.

Figure 7:
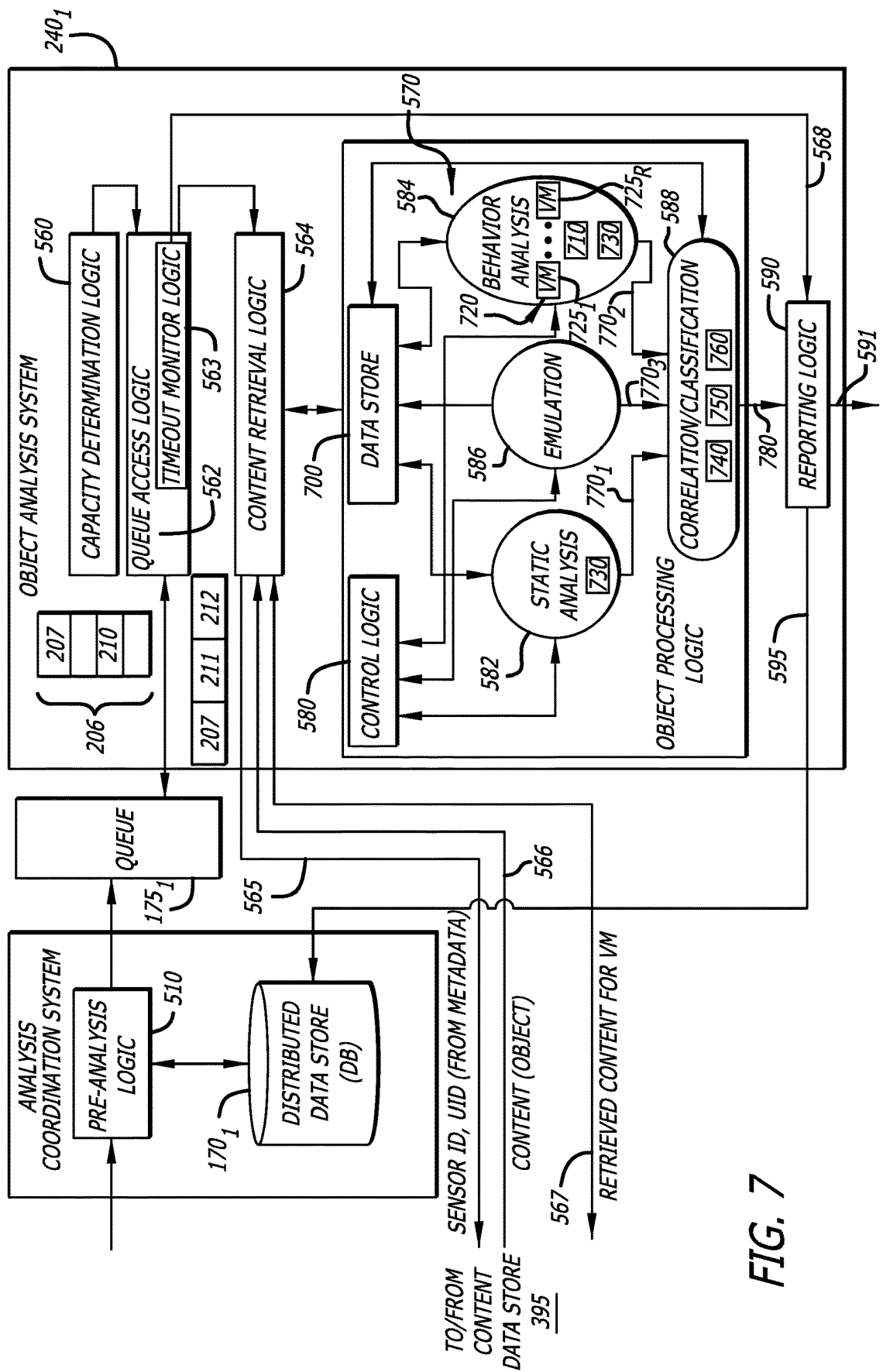
FIG. 7 is a flow diagram of operations conducted by an exemplary embodiment of logic implemented within the analysis coordination system of FIG. 5A and the object analysis system of FIG. 5B.

Referring to FIG. 7, a flow diagram of operations conducted by an exemplary embodiment of logic implemented within the analysis coordination system $220_1$ of FIG. 5A and the object analysis system $240_1$ of FIG. 5B is shown. As described in FIG. 6, in response to the pre-analysis (filtering) logic 510 determining that the malware detection system 100 has not processed any objects identical or substantially related to the suspicious object 204, the pre-analysis (filtering) logic 510 creates a storage entry associated with the suspicious object 204, including the UUID 211 along with the representative content 210, the sensor ID 207 and the operation mode identifier 212 that are provided as part of the metadata 206, into the distributed data store 170. The portions of the metadata 206 are subsequently uploaded to the distributed queue 175.

Within the object analysis system $240_1$, the capacity determination logic 560 determines whether the computing node $160_1$, which features the object analysis system $240_1$, has sufficient processing capacity to handle an in-depth malware analysis of a suspicious object associated with the metadata 206, is provisioned with guest images necessary for conducting a particular malware analysis on the object 204 associated with the metadata 206, is configured for handling an object type corresponding to the object 204, or the like. This may involve an analysis of the operating state of the computing node $160_1$, such as determining whether the current processing capacity of the processor 400 of FIG. 4 falls below a load threshold (e.g., 90%), the number of virtual machines available for behavioral analysis of the suspicious object 204 is greater than a selected threshold (e.g., virtual machines), or the like. This logic provides load balancing capabilities without requiring synchronization of the computing nodes If the operating state of the computing node $160_1$ would support performance of a malware analysis of a suspicious object, the capacity determination logic 560 notifies the queue access logic 562 to commence selection of metadata from the distributed queue 175 of FIG. 2. The selection may be based on a First-In-First-Out (FIFO) queue selection scheme where the oldest metadata awaiting processing by any analysis system is selected. Of course, it is contemplated that the selection may be arranged in accordance with another scheme, such as a level of suspiciousness of the object, anticipated object type, sensor priority where certain sensors may be located to protect certain highly sensitive resources within the enterprise network, or the like.

It is contemplated that the queue access logic 562 may include timeout monitor logic 563 that determines whether the portion of the metadata 206 removed from the distributed queue 175 has experienced a timeout. If so, the timeout monitor logic 563 provides the UUID and sensor ID associated with the metadata 206 to the reporting logic 590 via the communication path 568. In response, the reporting logic 590 is configured to provide the timeout event information 591 to the distributed data store 170 and/or the notification logic 380 of the sensor $110_1$ of FIG. 2 when the object analysis system $240_1$ is operating in active mode. When operating in passive mode, as identified by the operation mode identifier 212 within the metadata 206, the analytic results and any detected timeout events determined by timeout monitor logic 563 are made available to a requesting network device.

Upon receipt of the metadata 206, the content retrieval logic 564 commences retrieval of the suspicious object 204 that corresponds to the metadata. First, the content retrieval logic 564 obtains the sensor ID 207 that identifies sensor $110_1$ submitted the metadata 206 and is responsible for storage of the suspicious object 204. Second, besides the sensor ID 207, the content retrieval logic 564 further obtains the UUID 211 accompanying the metadata 206 for use in identifying the suspicious object 204. The content retrieval logic 564 sends the request message 565 including the sensor ID 207 and the UUID 211 as parameters to logic 396 that manages accesses to the content data store 395 (sometimes referred to as "data store management logic") and awaits the response message 566 that includes a link to the object (from which the object may be accessed) or the suspicious object itself (i.e., suspicious object 204). Although not shown, it is contemplated that an object stored in the content data store 395 is deleted in response to a timeout event occurring for that object, as detected by the timeout monitoring logic 370.

Referring back to FIG. 7, the returned information (link to object or object) may be temporarily stored in a data store 700 awaiting processing by the object processing logic 570, which includes one or more of the static analysis logic subsystem 582, the behavior analysis logic subsystem 584, and/or the emulation analysis logic subsystem 586. The control logic 580 controls the processing of the suspicious object 204.

More specifically, the object processing logic 570 includes the static analysis logic subsystem 582, the behavior analysis logic subsystem 584, and/or the emulation analysis logic subsystem 586 as well as the correlation/classification logic 588 and the control logic 580. Although the analysis logic 582, 584 and 586 disposed within the object analysis system $240_1$ is shown in a parallel topology, it is contemplated that the analysis logic 582, 584 and 586 may be communicatively coupled in a serial configuration or a daisy-chain configuration. It should be appreciated that the static analysis logic subsystem 582, the behavior analysis logic subsystem 584, the emulation analysis logic subsystem 586, the correlation/classification logic 588, and the reporting logic 590 may each be separate and distinct components, but any combination of such logic may also be implemented in a single memory block and/or core.

According to one embodiment, it is contemplated that the metadata 206 that may be used, at least in part by a virtual machine manager (VMM) 710, for provisioning one or more virtual machines 720 in the behavior analysis logic subsystem 584. The one or more virtual machines (VMs) 720 may conduct run-time processing of at least some of the information associated with the suspicious object 204. It is contemplated that the metadata 206 may include data directed to the object type (e.g., PDF file, word processing document, HTML (web page) file, etc.), the type of operating system at the source that provided the object 160, web browser type, or the like.

Additionally, or in an alternative, the metadata 206 may further include information that may be utilized by the correlation/classification logic 588 for classifying the suspicious object 204. The metadata 206 may include information associated with the delivery mechanism for the suspicious object 204 which, depending on the object type, may include information extracted from a header of a packet (e.g., source IP address, destination IP address, etc.) or from the body or header of the email message (e.g., sender's email address, recipient's email address, subject line, etc.). Hence, although not shown in detail, the metadata 206 may operate as another analysis type in addition to the static analysis (characteristics), dynamic analysis (behaviors), and/or emulation (e.g., emulation results).

Referring still to FIG. 7, the static analysis logic subsystem 582 is configured to inspect information associated with the suspicious object 204 using logic models 730 for anomalies in characteristics such as formatting anomalies for example. In some embodiments, the static analysis logic subsystem 582 may also be configured to analyze the suspicious object 204 for certain characteristics, which may include the object's name, type, size, path, or protocols. Additionally, or in the alternative, the static analysis logic subsystem 582 may analyze the suspicious object 204 by performing one or more checks, including one or more signature checks, which may involve a comparison between (i) content of the suspicious object 204 and (ii) one or more pre-stored signatures associated with known malware. In one embodiment, pre-stored signatures may be stored on the distributed data store 170. Checks may also include an analysis to detect exploitation techniques, such as any malicious obfuscation, using, for example, probabilistic, heuristic, and/or machine-learning algorithms.

Additionally, the static analysis logic subsystem 582 may feature a plurality of rules that may be stored on the data store 700, for example, wherein the rules control the analysis conducted on the suspicious object 204. The rules may be based, at least in part, on machine learning; pattern matching; heuristic, probabilistic, or determinative analysis results; experiential knowledge; analyzed deviations in messaging practices set forth in applicable communication protocols (e.g., HTTP, HTTPS, TCP, etc.); analyzed compliance with certain message formats established for the protocol (e.g., out-of-order commands); and/or analyzed header or payload parameters to determine compliance. It is envisioned that the rules may be updated from an external source, such as via a remote source (e.g., threat intelligence network), in a periodic or aperiodic manner.

It is envisioned that information associated with the suspicious object 204 may be further analyzed using the behavior (dynamic) analysis logic subsystem 584. Herein, the behavior analysis logic subsystem 584 features the VMM 710 and one or more virtual machines (VMs) 720, namely $VM_1$ $725_1$-$VM_R$ $725_R$ (R≥1), and monitoring logic 730. One or more of the VMs $725_1$-$725_R$ are configured to process the suspicious object 204, and the behaviors of the suspicious object 204 and/or VM(s) $725_1$-$725_R$ may include anomalous behaviors. In general terms, each of the VMs 720 includes at least one run-time environment, which features a selected operating system and one or more applications to process the suspicious object 204, which is expected for the type of suspicious object 204 under analysis or based on the targeted destination for the suspicious object 204. For instance, where the suspicious object 204 is a URL, the run-time environment may include a specific OS type along with one or more web browser applications. Herein, the control logic 580 or logic within the dynamic analysis logic subsystem 584 may be adapted to provision one or more VMs $725_1$-$725_R$ (e.g., $VM_1$-$VM_R$) using information within the metadata 206 and/or information from the static analysis logic subsystem 582.

Herein, it is contemplated that the VMs $725_1$-$725_R$ may be provisioned with the same or different guest image bundles, where one VM $725_1$ may be provisioned with one or more application instances supported by a first type of operating system (e.g., Windows®) while another VM $725_2$ may be provisioned with a second type of operating system (e.g., MAC® OS X) supporting one or more other application instances. Furthermore, VMs $725_1$-$725_R$ may be provisioned with customer specific guest image instances. According to one embodiment, the provisioning may be accomplished through a customer preference configuration option that is uploaded to the VMM 710 of the dynamic analysis logic subsystem 584. The configuration option may be structured to identify the application version(s) and/or operating system(s) supported by the VMs $725_1$-$725_R$. As an illustrative embodiment, each VM $725_1$ . . . or $725_R$ may be provisioned with one or more guest images directed to a single application version/operating system version (e.g., Microsoft® Word 2013 and Windows® 7 OS), multiple (two or more) application versions and a single OS version (e.g., Microsoft® Words® applications supported by Windows® 10 OS), multiple application versions and multiple OS versions (e.g., Microsoft® Words® applications supported by one or more Windows®-based OSes or MAC®-based OSes), or even single application and multiple OS deployment.

Additionally, the VMs $725_1$-$725_R$ for each computing node may be provided for dedicated processing of a certain object type such as emails, network traffic including webpages/URLs, or the like. For this configuration, it is contemplated that queue $175_1$ may be segmented in which one or more portions of the queue $175_1$ are reserved for metadata associated with the certain object type while other object types are maintained in another portion of the queue $175_1$. In lieu of segmenting queue $175_1$, it is further contemplated that a different queue may be assigned for objects of the certain object type.

Furthermore, it is contemplated that the VMs within the object analysis systems (e.g., VMs $725_1$-$725_R$ of object analysis system $240_1$) may be provisioned so that different object analysis systems (computing nodes) support different types or levels of malware analysis. For instance, computing node $160_1$ of FIG. 2 may be configured to support malware analyses directed to email communications while computing node $160_2$ may be configured to support malware analyses directed to webpage/URL network traffic. Also, the computing node $160_1$ may be configured to support more in-depth malware analyses or more recent code releases than computing node $160_2$. As an example, computing node $160_1$ of FIG. 2 may be configured to support (i) longer or shorter malware analyses, (ii) more in-depth malware analyses or (iii) more recent code releases than computing node $160_2$ of FIG. 2.

Monitoring logic 730 within the dynamic analysis logic subsystem 584 may observe one or more behaviors with respect to the suspicious object 204 that are attributable to the object 204 or attributable to the execution of the object 204 within one or more VMs 720. These monitored behaviors may be used in a determination by the correlation/classification logic 588 as to whether the suspicious object 204 is associated with malware (i.e., the likelihood of the suspicious object 204 including malware and deemed malicious exceeds the second prescribed threshold). During processing of certain types of objects, such as the URL for example, the one or more VMs 720 (e.g., VM $725_1$) may initiate a request message or successive request messages 567 to data store management logic 396 via the content retrieval logic 564 for additional information prompted through the processing of the URL. This information may involve web pages that would have been accessed during activation of the URL as well as objects within the web pages themselves. If the requested information is available, the data store management logic 396 returns the requested information via the content retrieval logic 564, operating as a proxy, to the VM $725_1$. If the requested information is not available, however, the control logic 580 operating alone or in combination with other logic (e.g. the emulation analysis logic 586) may serve the request to enable the VM $725_1$ to continue processing the URL (suspicious object 204).

As further shown in FIG. 7, the suspicious object 204 may be further analyzed using the emulation analysis logic subsystem 586, which is configured so as to enable the analysis system $240_1$ to behave like any another computer system ("guest" system). It is envisioned that the emulation analysis logic subsystem 586 may be configured so as to enable the analysis system $240_1$ to simulate the operations of any of various software, applications, versions and the like, designed for the guest system. More specifically, the emulation analysis logic subsystem 586 may be configured so as to model hardware and software.

It should be understood that the static analysis logic subsystem 582, the dynamic analysis logic subsystem 584, the emulation analysis logic subsystem 586, the correlation/classification logic 588, and/or the reporting logic 590 may be implemented as one or more software modules executed by one or more processors as shown in FIGS. 4 & 5A-5B.

As further shown in FIG. 7, the correlation/classification logic 588 includes attribute correlation logic 740, threat index generation logic 750 and object classification logic 760. Herein, the attribute correlation logic 740 is configured to receive results $770_1$, $770_2$ and/or $770_3$ from logic subsystems 582, 584 and/or 586, respectively. The attribute correlation logic 740 attempts to correlate some or all of attributes (e.g., behaviors and/or characteristics) within the results $770_1$-$770_3$ associated with the suspicious object 204 in accordance with a prescribed correlation rule set (not shown). The correlation rule set may be stored locally or in the data store 700 and may be updated. For this embodiment, the correlation determines what particular attributes and/or combination of attributes have been collectively detected by the static analysis logic subsystem 582 and dynamic analysis logic subsystem 584 in accordance with the attribute patterns set forth in the correlation rule set.

Herein, as a non-limiting illustration, the attributes and/or combinations of attributes constitute contextual information associated with the suspicious object 204, which is provided to the threat index generation logic 750 to determine one or more threat indices. The operability of the threat index generation logic 750 is controlled by a threat index data set (not shown), which may be stored locally or within the data store 700. The one or more threat indices are used by the object classification logic 760 to determine whether or not the suspicious object 204 is malicious, where such analysis is described in U.S. patent application Ser. No. 14/986,416 entitled "Malware Detection System With Context Analysis," filed Dec. 31, 2015, the entire contents of which are incorporated by reference.

The analytic results 780 from the correlation/classification logic 588 along with certain portions of the metadata associated with the object (e.g., UUID) are provided to the reporting logic 590. The reporting logic 590 may generate alerts directed to the client administrators or management system as shown in FIG. 1. Also, the reporting logic 590 may provide (i) at least a portion of the analytic results 595 to the distributed data store 170 for storage in accordance with the UUID associated with the analyzed, suspicious object, or (ii) at least the portion of the analytic results 595 to metadata data store 390 via the notification logic 380.

B. Synchronous Load Balancing Architecture

Figure 8:
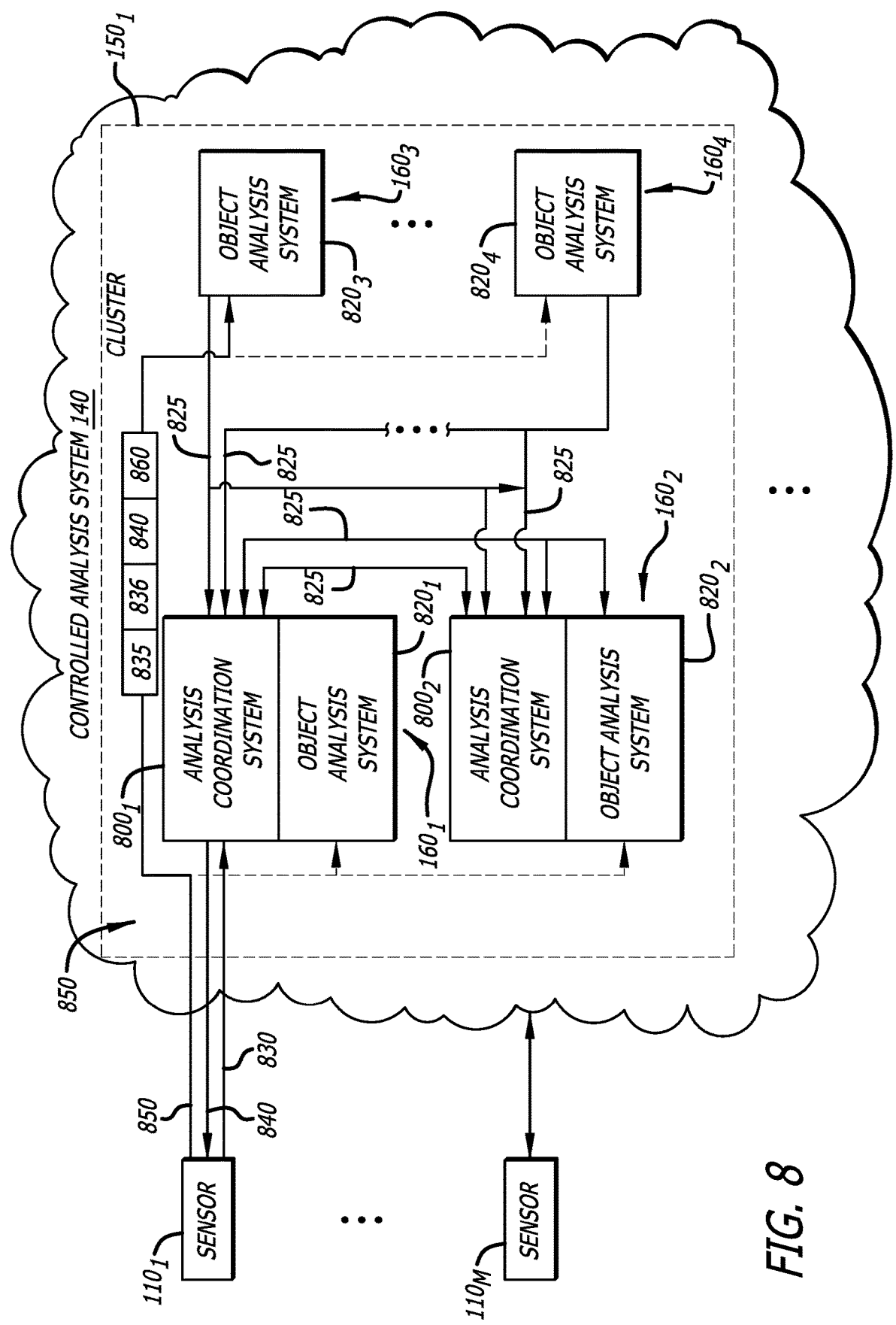
FIG. 8 is a second exemplary embodiment of logic implemented within a cluster operating as part of the centralized analysis system of FIG. 1 deploying a synchronous load balancing architecture.
Figure 9:
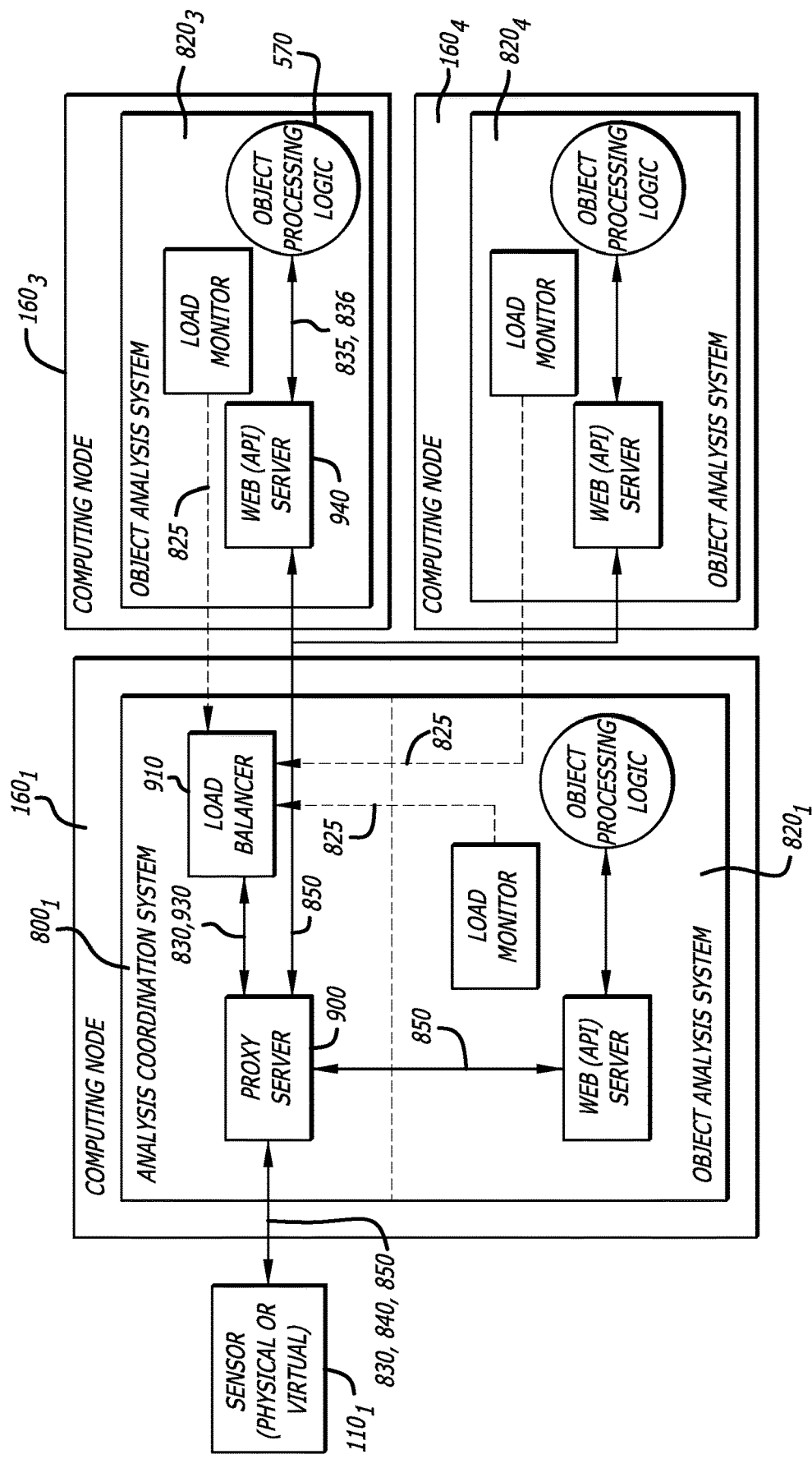
FIG. 9 is a block diagram of an exemplary embodiment of logic implemented within a computing node configured in accordance with the synchronous load balancing architecture.
Figure 10:
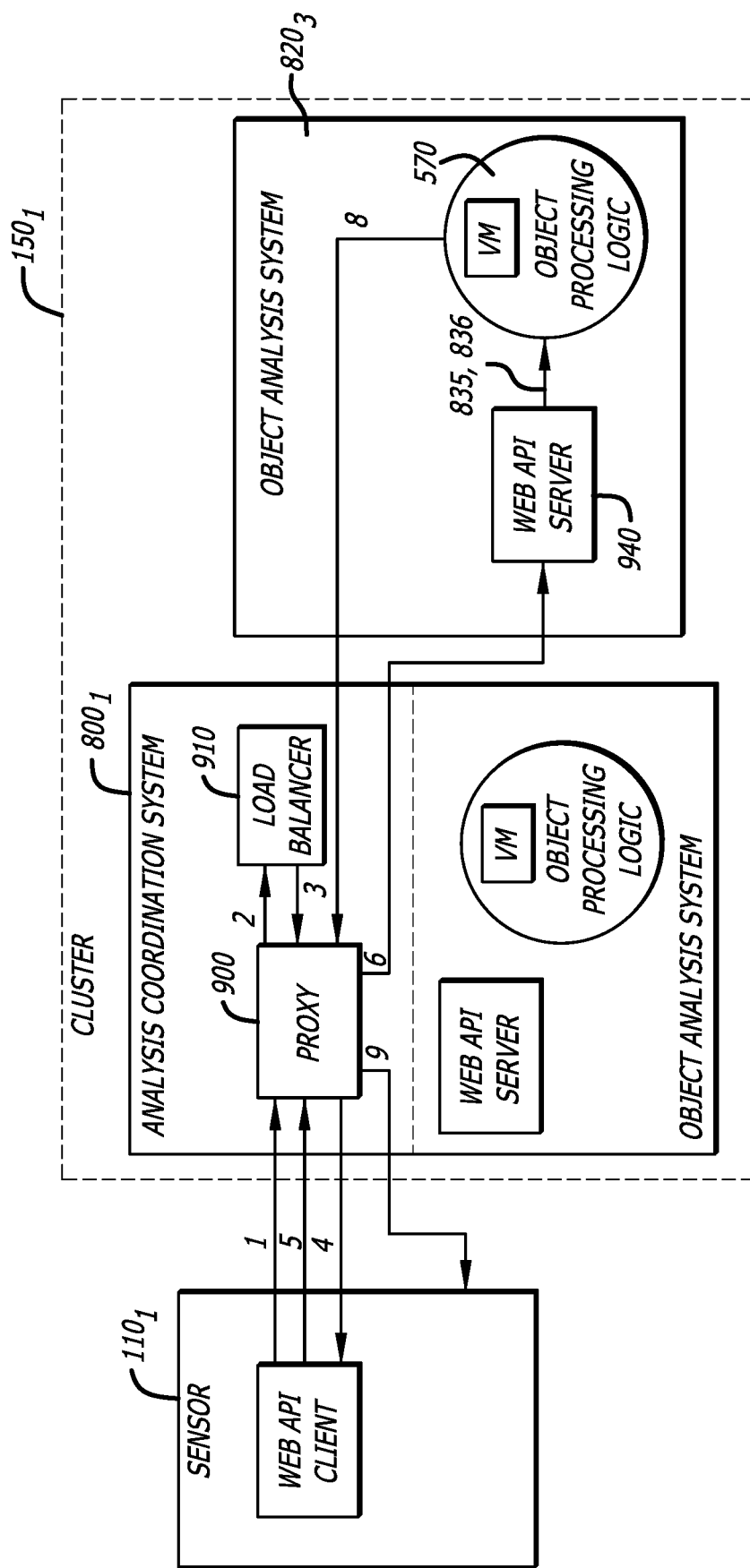
FIG. 10 is a block diagram of an operational flow between exemplary embodiments of a sensor, an analysis coordination system, and an object analysis system within a cluster of FIG. 1.

As an alternative embodiment to the asynchronous load balancing architecture described above, a synchronous load balancing architecture may be utilized as depicted in FIGS. 8-10 and described below. Each of these architectures includes one or more sensors and one or more clusters of computing nodes. As shown in FIG. 8, the cluster $150_1$ comprises a plurality of computing nodes $160_1$-$160_P$ (P≥1, P=4) where each computing node (e.g., computing node $160_1$) comprises an analysis coordination system $800_1$ and an object analysis system $820_1$. The analysis coordination system $800_1$ may be activated or deactivated, where the computing node $160_1$ operates as a "broker" computing node when the analysis coordination system $800_1$ is activated or operates as an "analytic" computing node when the analysis coordination system $800_1$ is deactivated.

Differing from the asynchronous load balancing architecture illustrated in FIG. 2, each object analysis system $820_1$-$820_4$ within the cluster $150_1$ is configured to provide load information 825 to each active analysis coordination system within the same cluster $150_1$ (e.g., analysis coordination system $800_1$ and $800_2$). The active analysis coordination systems $800_1$ and $800_2$ are responsible for performing load balancing operations for the cluster $150_1$. The load information 825 may include information directed to the amount of computational work currently being performed by the object analysis system, where the amount of computational work may be represented by one or more measurable factors, including number of analyses of objects being currently performed, the number of virtual machines being utilized, processor load or processor utilization, or the like. Hence, the analysis coordination systems $800_1$ and $800_2$ are responsible for selecting the particular object analysis system $820_1, \ldots,$ or $820_4$ based, at least in part, on workload.

Herein, the load balancing for each of the object analysis system $820_1$-$820_4$ avoids bottlenecks or long latencies. However, it is contemplated that more complex considerations may be used besides load. For instance, where the loads are equivalent but the object analysis system $820_1$ begins to operate in a degraded mode, one or more of the other object analysis systems $820_2, \ldots,$ or $820_4$ will need to increase performance/

As shown, for a communication session, sensors $110_1$-$110_M$ are communicatively coupled directly to the first cluster $150_1$ via a broker computing node, where each sensor $110_1$-$110_M$ is assigned to a particular broker computing node during registration process and this assignment is assessed periodically or aperiodically in case an adjustment is needed due to workload. Herein, each sensor $110_1, \ldots,$ or $110_M$ is configured to transmit a first message 830 (e.g., a Hypertext Transfer Protocol "HTTP" transmission) as a data submission to its assigned analysis coordination system $800_1$ or $800_2$. As shown, sensor $110_1$ transmits the data submission 830 to analysis coordination system $800_1$.

In the event that this transmission is associated with a new communication session, the analysis coordination system $800_1$ conducts a load balance analysis and selects one of the object analysis systems $820_1$-$820_4$ to handle malware analysis for an object 835 that has been detected by the sensor $110_1$ as suspicious. An identifier 840 of the selected object analysis system, sometimes referred to as a "cookie", is returned to the sensor $110_1$ from the analysis coordination system $800_1$.

In response to receiving the cookie 840 and without terminating the communication session, the sensor $110_1$ transmits a second message 850 to the selected object analysis system (e.g., object analysis system $820_3$). The second message 850 includes the object 835 for analysis, metadata 836 associated with the object 835, the identifier 840 of the selected object analysis system $820_3$ as a targeted destination, and an identifier 860 of the sensor $110_1$ as a source. The analysis coordination system $800_1$ translates the identifier 840 to appropriate address information of the selected object analysis system $820_3$ and redirects the second message 850 to the selected object analysis system $820_3$ for conducting malware analysis on the object 835.

Similar to the operations described in FIG. 2, prior to the communication exchange with the assigned analysis coordination system $800_1$, the sensor $110_1$ is configured to receive incoming data that includes the object 835 and corresponding metadata 836. Upon receipt of the incoming data, the sensor $110_1$ separates the metadata 836 from the object 835 and conducts a preliminary analysis of the object 835 to determine whether the object 835 is suspicious (e.g., a first level of likelihood that the object includes malware). The preliminary analysis may include one or more checks being conducted on the object 835 and/or the metadata 836 (e.g., bit pattern comparisons, blacklist or whitelist analysis, etc.).

Upon failing to determine that the object 835 is suspicious, the sensor $110_1$ avoids transmission of the first message 830 that initiates an in-depth malware analysis of the object 835. However, in response to the sensor $110_1$ detecting that the object 835 is suspicious, the sensor $110_1$ transmits the first message 830 to initiate the communication session and commence routing of the object 835 to a selected object analysis system.

Referring to FIG. 9, a block diagram of an exemplary embodiment of the logic implemented within a computing node $160_1$ configured in accordance with the synchronous load balancing architecture is shown, where the computing node $160_1$ is configured in accordance with the synchronous load balancing architecture of FIG. 8. Herein, the computing node $160_1$ features the analysis coordination system $800_1$ and the object analysis system $820_1$. The analysis coordination system $800_1$ is communicatively coupled to object analysis systems $820_3$ and $820_4$ of computing nodes $160_3$ and $160_4$, respectively. Herein, the communications with the object analysis system $820_2$ are not shown for clarity purposes.

As shown, the analysis coordination system $800_1$ features a proxy server 900 communicatively coupled to the load balancer 910. The proxy server 900 is responsible for determining whether the data submission 830 from the sensor $110_1$ includes a cookie, which denotes an object analysis system targeted to receive the data submission. The load balancer 910 is responsible for the handling of load balancing for the object analysis systems $820_1$-$820_4$ within the cluster $150_1$. As shown, load balancer 910 receives load information 825 from load monitors $920_1$-$920_3$ that are configured to monitor workload of the object analysis systems $820_1$-$820_3$, respectively.

Herein, in response to receipt of the first message 830 from the sensor $110_1$, the proxy server 900 determines whether the first message 830 includes a cookie 840 that identifies one of the object analysis systems within the cluster $150_1$. If no cookie is found, the proxy server 900 forwards the first message 830 to the load balancer 910, which returns a message 930 with the assigned cookie 840 identifying the selected object analysis system (e.g., object analysis system $820_3$) to the proxy server 900. Thereafter, the proxy server 900 returns at least the cookie 840 from the message 930 to the server $110_1$, which causes the sensor $110_1$ to transmit the second message 850, including the object 835 for analysis, back to the proxy server 900.

Upon receipt of the second message 850, the proxy server 900 redirects the second message 850 to a web server 940, which effectively provides an address (e.g., IP address) for the object analysis system $820_3$ within the computing node $160_1$. Thereafter, the web server 940 may parse the second message 850 to extract the object 835 for processing and the metadata 836 for use in VM configuration of the object processing logic 570, as described above.

Referring to FIG. 10, a block diagram illustrating an operational flow between exemplary embodiments of the sensor $110_1$, analysis coordination system $800_1$, and object analysis system $820_3$ within the cluster $150_1$ deploying a synchronous load balancing architecture is shown. Herein, in response to receipt of a message from the sensor $110_1$, such as web (API) client that controls the load balancing signaling with the sensor $110_1$ (operation "1"), the proxy server 900 determines whether the message includes a cookie that identifies one of the object analysis systems within the cluster $150_1$. If no cookie is found, the proxy server 900 forwards the message to the load balancer 910 (operation "2"), which returns a message with an assigned cookie identifying the selected object analysis system (e.g., object analysis system $820_3$) to the proxy server 900 (operation "3"). Thereafter, the proxy server 900 returns contents of the message to the server $110_1$ (operation "4"). The receipt of the returned message causes the sensor $110_1$ to transmit a second message, including the object for analysis along with its metadata, back to the proxy server 900 (operation "5").

Upon receipt of the second message, the proxy server 900 redirects the second message to the web (API) server 940 (operation "6"), which parse the second message to extract the object 835 for processing and the metadata 836 for use in VM configuration of the object processing logic 570 (operation "7"). Within the object processing logic 570, the object 835 undergoes static analysis, behavioral (dynamic) analysis and/or emulation analysis to produce attributes that are analyzed by correlation/classification logic to determine whether the object 835 is associated with malware. The results of the analysis by the object processing logic 570 may be returned to the proxy server 900 (operation "8"), and subsequently made available to the sensor $110_1$ through a push or pull data delivery scheme (operation "9"). Although not shown, it is contemplated that object analysis system $820_3$ includes content retrieval logic (e.g., content retrieval logic 564 of FIG. 7) that operates to retrieval additional information requested by the VM during processing of the object 835.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computing node comprising:
a hardware processor;
a non-transitory storage medium communicatively coupled to the hardware processor, the non-transitory storage medium comprises:
a first analysis coordinator that, when executed by the hardware processor, is configured to analyze incoming metadata received from a remotely located network device and to store at least a portion of the incoming metadata within a first data store, and
a first object analyzer that, when executed by the hardware processor, is configured to retrieve the portion of the incoming metadata from the first data store, retrieve a suspicious object associated with the incoming metadata from the network device using metadata that is part of the portion of the incoming metadata, and analyze the suspicious object for malware,
wherein the first analysis coordinator comprises monitoring logic that, when executed by the hardware processor, controls an amount of time allocated to complete malware analysis of the suspicious object, where the amount of time allocated is based, at least in part, on content within the incoming metadata and is used by the first object analyzer to determine whether to analyze the suspicious object.

2. The computing node of claim 1, wherein the first data store operating as a queue.

3. The computing node of claim 2, wherein the first object analyzer is further configured to determine whether the computing node features sufficient processing capacity to perform a malware analysis of the suspicious object prior to retrieval of the portion of the incoming metadata.

4. The computing node of claim 1, wherein the first analysis coordinator comprises the monitoring logic that, when executed by the hardware processor, is configured to monitor a data store for the incoming metadata and compute a timeout value representing the amount of time that is remaining to complete the malware analysis of the suspicious object prior to storage of the portion of the incoming metadata into the first data store.

5. A computing node comprising:
a hardware processor; and
a non-transitory storage medium communicatively coupled to the hardware processor, the non-transitory storage medium comprises
a first analysis coordinator that, when executed by the hardware processor, is configured to analyze incoming metadata received from a remotely located network device and to store at least a portion of the incoming metadata within a first data store, and
a first object analyzer that, when executed by the hardware processor, is configured to retrieve the portion of the incoming metadata from the first data store, retrieve a suspicious object associated with the incoming metadata from the network device using metadata that is part of the portion of the incoming metadata, and analyze the suspicious object for malware,
wherein the first analysis coordinator comprises monitoring logic that, when executed by the hardware processor, is configured to monitor a data store for the incoming metadata and compute a timeout value representing an amount of a time period that is remaining to complete malware analysis of the suspicious object for determining whether to conduct the analysis of the suspicious object by the first object analyzer, where the timeout value is associated with the incoming metadata.

6. The computing node of claim 5, wherein the first analysis coordinator is communicatively coupled to a sensor operating as the network device, the sensor being configured to (i) conduct a preliminary analysis of an object in the information propagating over a network by at least analyzing data associated with the object, (ii) determine whether there exists a prescribed level of likelihood that the object is associated with malware and corresponds to the suspicious object, and (iii) store the incoming metadata and the suspicious object into one or more data stores, the incoming metadata being provided to the first analysis coordinator for analysis and being subsequently used for retrieving the suspicious object from the one or more data stores by the first object analyzer.

7. The computing node of claim 6 operating as a broker computing node that establishes and maintains communications with the sensor when the first analysis coordinator is activated and being executed by the hardware processor.

8. The computing node of claim 6, wherein the first analysis coordinator and the first object analyzer are communicatively coupled to the first data store operating as a queue, the first analysis coordinator to store at least the portion of the incoming metadata within the first data store in response to determining that the incoming metadata is not associated with an object that has been previously analyzed by a cluster including at least the first object analyzer and at least one object analyzer that is deployed as part of a different computing node than the computing node.

9. The computing node of claim 5, wherein the first analysis coordinator comprises pre-analysis logic that, when executed by the hardware processor, conducts an analysis of the suspicious object to determine whether a representation of the suspicious object included in the incoming metadata corresponds to any suspicious objects previously analyzed by a cluster including at least the first object analyzer and at least one object analyzer that is deployed as part of a different computing node than the computing node.

10. The computing node of claim 5, wherein the first object analyzer further comprising:
capacity determination logic that, when executed by the hardware processor, determines whether the first object analyzer has sufficient processing capacity to handle malware analysis of the suspicious object prior to retrieval of the portion of the incoming metadata; and
access logic communicatively coupled to the capacity determination logic, the access logic, when executed by the hardware processor, retrieves the portion of the metadata from the first data store.

11. The computing node of claim 10, wherein the first object analyzer further comprising:
content retrieval logic communicatively coupled to the access logic, the content retrieval logic, when executed by the hardware processor, commences retrieval of the suspicious object corresponding to the portion of the metadata based, at least in part, on an identifier included as part of the portion of the metadata.

12. The computing node of claim 11, wherein the first object analyzer further comprising:
object processing logic communicatively coupled to the content retrieval logic, the object processing logic, when executed by the hardware processor, conducts the malware analysis of the suspicious object to determine whether the suspicious object is associated with malware; and
reporting logic communicatively coupled to the object processing logic, the reporting logic, when executed by the hardware processor, reports whether or not the suspicious object is associated with malware.

13. The computing node of claim 12, wherein the object processing logic comprises
a behavior analysis logic subsystem to analyze behaviors of the suspicious object corresponding to the portion of the metadata being processed within one or more virtual machines; and
a classification logic to receive results from at least the behavior analysis logic to determine whether a likelihood of the suspicious object corresponding to the portion of the metadata being associated with malware exceeds a prescribed threshold to classify the suspicious object corresponding to the portion of the metadata as a malicious object.

14. The computing node of claim 5, wherein the first analysis coordinator being deactivated so that the computing node operates as an analytic computing node by the first object analyzer retrieves the portion of the metadata within the first data store and conducts malware analysis on the suspicious object associated with the portion of the metadata.

15. A scalable, malware detection system comprising:
a first computing node of a plurality of computing nodes; and
a second computing node of the plurality of computing nodes communicatively coupled to the first computing node and collectively operating with the first computing node as a cluster, the cluster further includes a queue to receive metadata associated with suspicious objects queued for analysis by any of the plurality of computing nodes,
wherein the first computing node includes a first analysis coordinator being configured to (i) receive metadata associated with a first suspicious object, (ii) analyze the metadata associated with the first suspicious object to determine whether further analysis of the first suspicious object is to be conducted, (iii) responsive to determining that the first suspicious object is to be analyzed for malware, store at least a portion of the metadata in the queue that is used in an ordering of malware analyses conducted by the cluster, and (iv) monitor for incoming metadata and prior to storage of the portion of the incoming metadata in the queue, computing a timeout value representing an amount of a time period that is remaining to complete malware analysis of the first suspicious object, the timeout value being stored as a part of the metadata, and
wherein the second computing node includes a first object analyzer communicatively coupled to the first analysis coordinator, the first object analyzer being configured to (i) retrieve the portion of the metadata from the queue, (ii) retrieve the first suspicious object using at least part of the portion of the metadata, and (iii) analyze the first suspicious object for malware.

16. The system of claim 15, wherein the first analysis coordinator of the first computing node computing the timeout value for use by the first object analyzer of the second computing node to determine whether to analyze the first suspicious object.

17. The system of claim 15, wherein the first analysis coordinator is communicatively coupled to a sensor, the sensor being configured to (i) conduct a preliminary analysis of an object included as part of information propagating over a network by at least analyzing data associated with the object, (ii) determine whether there exists a prescribed level of likelihood that the object is associated with malware in which the object corresponds to the first suspicious object, and (iii) store incoming metadata and the first suspicious object into one or more data stores, the portion of the metadata being at least part of the incoming metadata and being subsequently used for retrieving the first suspicious object from the one or more data stores by the first object analyzer.

18. The system of claim 17, wherein the first computing node operating as a broker computing node that establishes and maintains communications with the sensor.

19. The system of claim 15, wherein the first computing node includes an object analyzer that is disabled.

20. The system of claim 15, wherein the first analysis coordinator comprises
pre-analysis logic configured to conduct an analysis of the first suspicious object to determine whether a representation of the first suspicious object included in the metadata corresponds to any suspicious objects previously analyzed by the cluster.

21. The system of claim 15, wherein the first object analyzer comprising:
capacity determination logic configured to determine whether the first object analyzer has sufficient processing capacity to handle malware analysis of the first suspicious object prior to retrieval of the portion of the metadata from the queue; and
access logic communicatively coupled to the capacity determination logic, the access logic retrieves the portion of the metadata from the queue.

22. The system of claim 21, wherein the first object analyzer further comprising:
content retrieval logic communicatively coupled to the access logic, the content retrieval logic commences retrieval of the first suspicious object corresponding to the portion of the metadata based, at least in part, on an identifier included as part of the portion of the metadata.

23. The system of claim 22, wherein the first object analyzer further comprising:
object processing logic communicatively coupled to the content retrieval logic, the object processing logic being configured to conduct the malware analysis of the first suspicious object to determine whether the first suspicious object is associated with malware; and
reporting logic communicatively coupled to the object processing logic, the reporting logic being configured to report whether or not the first suspicious object is associated with malware.

24. The system of claim 23, wherein the object processing logic comprises:
a behavior analysis logic subsystem to analyze behaviors of the first suspicious object corresponding to the portion of the metadata being processed within one or more virtual machines; and
a classification logic to receive results from at least the behavior analysis logic to determine whether a likelihood of the first suspicious object corresponding to the portion of the metadata being associated with malware exceeds a prescribed threshold to classify the first suspicious object corresponding to the portion of the metadata as a malicious object.

25. The system of claim 15, wherein the second computing node includes an analysis coordinator being deactivated so that the second computing node operates as an analytic computing node by the first object analyzer retrieving the portion of the metadata from the queue, retrieving the first suspicious object based at least on the portion of the metadata, and analyzes the first suspicious object for malware.

26. A computerized method for conducting a malware analysis of an object within a cluster, comprising:
receiving metadata associated with a first suspicious object by an analysis coordinator of a first computing node, the metadata being used by the analysis coordinator to determine whether further malware analysis is to be conducted on the first suspicious object;
responsive to determining that further malware analysis is to be conducted on the first suspicious object, computing, based on a part of the metadata, a timeout value representing an amount of a time period that is remaining to complete malware analysis of the first suspicious object and storing at least a portion of the metadata, including the timeout value, in a queue that is used, at least in part, in an ordering of malware analyses conducted by the cluster;
determining whether an object analyzer has an acceptable level of processing capacity to handle malware analysis of the first suspicious object prior to retrieval of the portion of the incoming metadata; and
retrieving the portion of the metadata from the queue by an object analyzer that is configured to (i) determine whether an object analyzer has an acceptable level of processing capacity to handle malware analysis of the first suspicious object, (ii) retrieve the portion of the metadata from the queue upon determining the object analyzer has at least the acceptable level of processing capacity to handle malware analysis of the first suspicious object, (iii) retrieve the first suspicious object using at least part of the portion of the metadata, and (iv) conduct the malware analysis on the first suspicious object.

27. The computerized method of claim 26 further comprising:
sending results of the malware analysis of the first suspicious object to a sensor for subsequent routing to a management system for dissemination to another cluster.

28. The computerized method of claim 26, wherein the conducting of the malware analysis includes processing the first suspicious object within a virtual machine that is provisioned with one or more guest images of at least one operating system and at least one application.

29. The computerized method of claim 28, wherein the virtual machine being provisioned with the one or more guest images to allow the virtual machine to process an object type corresponding to the first suspicious object.

30. A computing node comprising:
a hardware processor;
a non-transitory storage medium communicatively coupled to the hardware processor, the non-transitory storage medium comprises:
a first analysis coordinator that (a) supports communications with one or more remotely located network devices when the computing node is operating as a broker computing node and the first analysis coordinator is activated or (b) supports communications with another computing node that is operating as a broker computing node in lieu of any of the one or more remotely located network devices when the computing node is operating as an analytic computing node and the first analysis coordinator is deactivated, wherein the first analysis coordinator, operating as the broker computing node and executed by the hardware processor, is configured to (i) analyze incoming metadata received from the one or more remotely located network devices including determining based on the incoming metadata, a timeout value representing an amount of a time period that is remaining to complete malware analysis of a suspicious object the timeout value being part of the metadata, and (ii) store at least a portion of the incoming metadata within a first data store, and
a first object analyzer that, when executed by the hardware processor, is configured to receive a suspicious object associated with the incoming metadata and analyze the suspicious object for malware.

31. The computing node of claim 30, wherein the first object analyzer, when activated, is further configured to determine whether the computing node features sufficient processing capacity to perform a malware analysis of the suspicious object prior to retrieval of the portion of the incoming metadata to fetch the suspicious object for analysis by the first object analyzer.

32. The computing node of claim 30, wherein the first analysis coordinator is communicatively coupled to a sensor operating as a network device of the one or more remotely located network devices, the sensor being configured to (i) conduct a preliminary analysis of an object in the information propagating over a network by at least analyzing data associated with the object, (ii) determine whether there exists a prescribed level of likelihood that the object is associated with malware and corresponds to the suspicious object, and (iii) store the incoming metadata and the suspicious object into one or more data stores, the incoming metadata being provided to the first analysis coordinator for analysis and being subsequently used for retrieving the suspicious object from the one or more data stores by the first object analyzer.

* * * * *